(12) United States Patent
Takeshita et al.

(10) Patent No.: US 12,473,449 B2
(45) Date of Patent: Nov. 18, 2025

(54) INK SET, IMAGE RECORDING METHOD, IMAGE RECORDED ARTICLE, AND THREE-DIMENSIONAL ARTICLE AND METHOD FOR PRODUCING THE SAME

(71) Applicant: FUJIFILM Corporation, Tokyo (JP)

(72) Inventors: Kohei Takeshita, Kanagawa (JP); Kazuo Kamohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 452 days.

(21) Appl. No.: 17/852,351

(22) Filed: Jun. 28, 2022

(65) Prior Publication Data

US 2022/0348779 A1 Nov. 3, 2022

Related U.S. Application Data

(63) Continuation of application No. PCT/JP2020/043092, filed on Nov. 18, 2020.

(30) Foreign Application Priority Data

Jan. 14, 2020 (JP) ................................. 2020-003887

(51) Int. Cl.
 *C09D 11/38* (2014.01)
 *B29C 43/10* (2006.01)
 (Continued)

(52) U.S. Cl.
 CPC .............. *C09D 11/38* (2013.01); *B29C 43/10* (2013.01); *B41M 5/0023* (2013.01);
 (Continued)

(58) Field of Classification Search
 None
 See application file for complete search history.

(56) References Cited

U.S. PATENT DOCUMENTS

| 7,713,462 | B2 * | 5/2010 | Hayata | ................. | C09D 11/101 |
| | | | | | 427/466 |
| 8,518,169 | B2 * | 8/2013 | Oyanagi | ................ | C09D 11/36 |
| | | | | | 347/100 |

(Continued)

FOREIGN PATENT DOCUMENTS

| CN | 102993827 | 3/2013 |
| CN | 104228382 | 12/2014 |

(Continued)

OTHER PUBLICATIONS

Office Action of China Counterpart Application, with English translation thereof, issued on Dec. 26, 2022, pp. 1-28.

(Continued)

*Primary Examiner* — Sanza L. McClendon
(74) *Attorney, Agent, or Firm* — JCIPRNET

(57) ABSTRACT

Provided are an ink set including a first ink including an ethylenic unsaturated compound and a photopolymerization initiator, the first ink not including a colorant or including a white colorant, and a second ink including an ethylenic unsaturated compound, a photopolymerization initiator, and a colorant, wherein the proportion of the amount of a monofunctional monomer to the total amount of the ethylenic unsaturated compound included in the first ink is 95.0% by mass or more, the proportion of the amount of a monofunctional monomer to the total amount of the ethylenic unsaturated compound included in the second ink is 95.0% by mass or more, and, when the static surface tension of the first ink at 25° C. is defined as T1 and the static surface tension of the second ink at 25° C. is defined as T2, the value calculated by subtracting T1 from T2 is 1 mN/m or more, and applications of the ink set.

11 Claims, 1 Drawing Sheet

(51) Int. Cl.
  *B41M 5/00*  (2006.01)
  *B41M 7/00*  (2006.01)
  *C09D 11/037*  (2014.01)
  *C09D 11/101*  (2014.01)
  *C09D 11/107*  (2014.01)
  *C09D 11/322*  (2014.01)
  *C09D 11/40*  (2014.01)
  *C08F 2/50*  (2006.01)
  *C08K 3/013*  (2018.01)

(52) U.S. Cl.
  CPC ......... *B41M 7/0081* (2013.01); *C09D 11/037* (2013.01); *C09D 11/101* (2013.01); *C09D 11/107* (2013.01); *C09D 11/322* (2013.01); *C09D 11/40* (2013.01); *C08F 2/50* (2013.01); *C08K 3/013* (2018.01)

(56) References Cited

U.S. PATENT DOCUMENTS

| | | | | |
|---|---|---|---|---|
| 8,562,123 | B2 * | 10/2013 | Hayata | C09D 11/30 347/100 |
| 8,608,305 | B2 * | 12/2013 | Hayata | C09D 11/101 347/100 |
| 8,664,297 | B2 | 3/2014 | Fujii | |
| 8,752,950 | B2 * | 6/2014 | Hayata | C09D 11/101 347/100 |
| 8,807,728 | B2 * | 8/2014 | Hayata | B41J 2/01 347/100 |
| 8,940,813 | B2 * | 1/2015 | Araki | C09D 11/101 524/588 |
| 9,010,914 | B2 * | 4/2015 | Hayata | C09D 11/101 347/100 |
| 9,139,748 | B2 * | 9/2015 | Mizutani | C09D 11/322 |
| 9,243,154 | B2 * | 1/2016 | Nakano | C09D 11/101 |
| 9,598,591 | B2 * | 3/2017 | Mizutani | C09D 11/40 |
| 9,713,926 | B2 * | 7/2017 | Nakano | C09D 11/38 |
| 9,783,696 | B2 * | 10/2017 | Steert | C09D 11/322 |
| 10,245,852 | B2 * | 4/2019 | Nakano | C09D 11/322 |
| 10,472,532 | B2 * | 11/2019 | Okamoto | B41M 5/00 |
| 10,550,275 | B2 * | 2/2020 | Hirose | C09D 11/107 |
| 10,780,717 | B2 * | 9/2020 | Nakano | C09D 11/30 |
| 11,034,165 | B2 * | 6/2021 | Sato | B41J 2/2107 |
| 11,059,304 | B2 * | 7/2021 | Nakano | B41J 2/2117 |
| 11,247,481 | B2 | 2/2022 | Matsumoto et al. | |
| 11,332,629 | B2 * | 5/2022 | Kobayashi | C08L 75/04 |
| 11,549,028 | B2 | 1/2023 | Matsumoto et al. | |
| 11,884,079 | B2 * | 1/2024 | Nakano | C09D 11/101 |
| 2006/0189712 | A1 | 8/2006 | Kondo | |
| 2009/0155484 | A1 | 6/2009 | Nakamura et al. | |
| 2009/0202795 | A1 | 8/2009 | Hayata et al. | |
| 2013/0260092 | A1 | 10/2013 | Araki et al. | |
| 2013/0295342 | A1 | 11/2013 | Araki et al. | |
| 2014/0370214 | A1 | 12/2014 | Araki et al. | |
| 2015/0353751 | A1 | 12/2015 | Umebayashi | |

FOREIGN PATENT DOCUMENTS

| | | | |
|---|---|---|---|
| CN | 104937049 | 9/2015 | |
| CN | 109328142 | 2/2019 | |
| EP | 1911817 | 4/2008 | |
| EP | 1967556 | 9/2008 | |
| EP | 2230285 | 9/2010 | |
| EP | 2484729 | 8/2012 | |
| EP | 2650338 A2 * | 10/2013 | ........... C09D 11/101 |
| EP | 2853367 | 4/2015 | |
| EP | 2966133 | 1/2016 | |
| EP | 3608373 | 2/2020 | |
| JP | 2004285217 | 10/2004 | |
| JP | 2008100501 | 5/2008 | |
| JP | 2009144057 | 7/2009 | |
| JP | 2009185186 | 8/2009 | |
| JP | 2010137445 | 6/2010 | |
| JP | 2010137445 A * | 6/2010 | |
| JP | 2012177072 | 9/2012 | |
| JP | 2013227515 | 11/2013 | |
| JP | 5606567 | 10/2014 | |
| JP | 2019044174 A * | 3/2019 | ............... B41J 2/01 |
| JP | 6735011 B1 * | 8/2020 | |
| WO | 2006087930 | 8/2006 | |
| WO | 2015049873 | 4/2015 | |
| WO | 2019131215 | 7/2019 | |

OTHER PUBLICATIONS

"International Search Report (Form PCT/ISA/210) of PCT/JP2020/043092," mailed on Jan. 26, 2021, with English translation thereof, pp. 1-5.

"Written Opinion of the International Searching Authority (Form PCT/ISA/237)" of PCT/JP2020/043092, mailed on Jan. 26, 2021, with English translation thereof, pp. 1-8.

Office Action of Japan Counterpart Application, with English translation thereof, issued on Apr. 18, 2023, pp. 1-5.

"Notice of Reasons for Rejection of China Counterpart Application", issued on Jul. 18, 2023, with English translation thereof, p. 1-p. 28.

"Search Report of Europe Counterpart Application", issued on May 22, 2023, p. 1-p. 8.

"Final Office Action of China Counterpart Application", issued on Oct. 24, 2023, with English translation thereof, pp. 1-20.

* cited by examiner

INK SET, IMAGE RECORDING METHOD, IMAGE RECORDED ARTICLE, AND THREE-DIMENSIONAL ARTICLE AND METHOD FOR PRODUCING THE SAME

CROSS-REFERENCE TO RELATED APPLICATIONS

This application is a continuation application of International Application No. PCT/JP2020/043092, filed Nov. 18, 2020, the disclosure of which is incorporated herein by reference in its entirety. Further, this application claims priority from Japanese Patent Application No. 2020-003887, filed Jan. 14, 2020, the disclosure of which is incorporated herein by reference in their entirety.

BACKGROUND OF THE INVENTION

1. Field of the Invention

The present disclosure relates to an ink set, an image recording method, an image recorded article, and a three-dimensional article and a method for producing the three-dimensional article.

2. Description of the Related Art

Various studies have been conducted on an activity ray-curable ink.

For example, JP2012-177072A discloses an ink jet ink composition that has a high gloss, a high image density, low graininess, excellent adhesiveness to substrate, and excellent blocking resistance, the ink jet ink composition including:
 (Component A) a radical polymerizable monomer including at least components A-1 to A-4,
 (Component A-1) an N-vinyllactam,
 (Component A-2) a (meth)acrylate compound having a specific structure, such as cyclic trimethylolpropane formal acrylate,
 (Component A-3) a (meth)acrylate compound having a specific structure, such as 2-phenoxyethyl acrylate or 2-ethoxyethoxy ethyl acrylate, and
 (Component A-4) a (meth)acrylate compound having two or more functional groups; and
 (Component B) as a polymerization initiator, (Component B-1) a bisacylphosphine compound,
 wherein the total content of the components A-1 to A-3 is 65% to 90% by mass,
 wherein the content of the component A-4 is 1% to 9% by mass, and wherein the surface tension of the ink jet ink composition at 25° C. is 34.0 to 40.0 mN/m.

JP2013-227515A discloses an activity ray-curable ink composition that has excellent stretchability at high temperatures and excellent adhesiveness, that is excellent in terms of injection moldability (resistance to ink discharge) particularly in in-mold forming, and that forms an image in which cracking is unlikely to occur upon punching, the activity ray-curable ink composition including:
 (Component A) a monofunctional radical polymerizable monomer; and
 (Component B) a polyfunctional acrylate oligomer having a glass transition temperature of 20° C. or less and an acrylate value of 300 g/valence or more,
 wherein the component A includes (Component A-1) an N-vinyl compound and (Component A-2) an acrylamide derivative,
 wherein the content of the component A is 70% by mass or more of the total amount of the ink composition, and
 wherein the content of the component A-1 is 18% by mass or more of the total amount of the ink composition.

JP5254632B discloses an ink composition that has excellent curability and forms an image having excellent flexibility and excellent blocking resistance, the ink composition including:
 (A) a compound including an ethylenic unsaturated group and a silicone chain;
 (B) a polymerizable monomer; and
 (C) a radical polymerization initiator,
 wherein 75% by mass or more of the polymerizable monomer is a monofunctional polymerizable monomer selected from the group consisting of a monofunctional acrylate, a monofunctional methacrylate, a monofunctional vinyloxy compound, a monofunctional N-vinyl compound, a monofunctional ethylenic unsaturated carboxylic acid compound, a monofunctional acrylamide, and a monofunctional methacrylamide,
 wherein the polymerizable monomer includes an N-vinylcaprolactam as the monofunctional N-vinyl compound, and
 wherein the compound including an ethylenic unsaturated group and a silicone chain is an acrylic or methacrylic resin including an ethylenic unsaturated group and a silicone chain.

JP5419343B discloses an ink jet recording ink composition that has high sensitivity to irradiation with active radiation, that is capable of forming a cured film having excellent curability and excellent flexibility, the cured film having excellent adhesiveness to recording media and excellent blocking resistance after cured, and that has excellent ejection consistency when used in an ink jet apparatus,
 the ink jet recording ink composition including (A) a polymerizable compound and (B) a radical polymerization initiator,
 wherein the (A) polymerizable compound includes (A1) a polymerizable compound including a polymerizable unsaturated bond and an amino group in the molecule, and
 wherein the ratio of the amount of a monofunctional polymerizable monomer to the total amount of the (A) polymerizable compound is 90% by mass or more and 99.9% by mass or less, and the ratio of the amount of a polyfunctional polymerizable monomer to the total amount of the (A) polymerizable compound is 0.1% by mass or more and 10% by mass or less.

JP5606567B discloses an activity ray-curable ink composition that is excellent in terms of injection moldability (resistance to ink discharge), that has excellent adhesiveness and stretchability at high temperatures, and that forms an image in which cracking is unlikely to occur upon punching, the activity ray-curable ink composition including:
 (Component A) a monofunctional radical polymerizable monomer;
 (Component B) a polyfunctional oligomer having a glass transition temperature of 20° C. or less and an acrylate value of 300 g/valence or more; and
 (Component C) a difunctional radical polymerizable monomer having a viscosity of 15 mPa·s or less at 25° C.,
 wherein the component A includes an N-vinyl compound and a (meth)acrylate compound having a specific structure, such as cyclohexyl acrylate,
 wherein the component B is a urethane acrylate oligomer having an isophorone structure, wherein the content of the N-vinyl compound is 20% to 50% by mass of the total amount of the ink composition, wherein the content of the component A is 70% by mass or more of the total amount of the ink composition, and wherein the content of the component C is 0.5% to 3% by mass of the total amount of the ink composition.

SUMMARY OF THE INVENTION

In some cases, there are demands for a reduction in the occurrence of bleeding of an image recorded by a process of recording an image on an impermeable substrate using a first ink including an ethylenic unsaturated compound and a photopolymerization initiator, the first ink not including a colorant or including a white colorant, and a second ink including an ethylenic unsaturated compound, a photopolymerization initiator, and a colorant (i.e., a process for producing an image recorded article including an impermeable substrate and an image) and improvement of the heat stretchability of the recorded image.

Specifically, since an ink hardly permeates into an impermeable substrate, in the above process, the bleeding of the recorded image is more likely to occur than a case where a permeable substrate, such as a paper substrate, is used.

An image recorded article produced by the above-described process may be subjected to heat stretching (e.g., vacuum forming) to form a shaped product (e.g., three-dimensional article). In this case, if the heat stretchability of the image is low, cracking may occur in the image upon the heat stretching of the image recorded article.

Under the above circumstances, the provision of an ink set with which an image in which bleeding is unlikely to occur and which has excellent heat stretchability can be recorded and the applications of the ink set is anticipated.

An object of an aspect of the present disclosure is to provide an ink set and an image recording method with which an image in which bleeding is unlikely to occur and which has excellent heat stretchability can be recorded, an image recorded article that includes the image, and a three-dimensional article that includes an image in which bleeding and cracking are unlikely to occur and a method for producing the three-dimensional article.

Specific means for achieving the above object includes the following aspects.

<1> An ink set including:
a first ink including an ethylenic unsaturated compound and a photopolymerization initiator, the first ink not including a colorant or including a white colorant; and
a second ink including an ethylenic unsaturated compound, a photopolymerization initiator, and a colorant,
wherein the ethylenic unsaturated compound included in the first ink includes a monofunctional monomer that is a compound including one ethylenic unsaturated group, and a proportion of an amount of the monofunctional monomer to a total amount of the ethylenic unsaturated compound included in the first ink is 95.0% by mass or more,
wherein the ethylenic unsaturated compound included in the second ink includes a monofunctional monomer that is a compound including one ethylenic unsaturated group, and a proportion of an amount of the monofunctional monomer to a total amount of the ethylenic unsaturated compound included in the second ink is 95.0% by mass or more, and
wherein, when a static surface tension of the first ink at 25° C. is defined as T1 and a static surface tension of the second ink at 25° C. is defined as T2, a value calculated by subtracting T1 from T2 is 1 mN/m or more.

<2> The ink set described in <1>, wherein the value calculated by subtracting T1 from T2 is 1 to 15 mN/m.

<3> The ink set described in <1> or <2>, wherein the value calculated by subtracting T1 from T2 is 2 to 10 mN/m.

<4> The ink set described in any one of <1> to <3>, wherein the monofunctional monomer included in the first ink includes a compound represented by Formula (A) below, and a proportion of an amount of the compound represented by Formula (A) to the total amount of the ethylenic unsaturated compound included in the first ink is 5.0% by mass or more, wherein the monofunctional monomer included in the second ink includes a compound represented by Formula (A) below, and a proportion of an amount of the compound represented by Formula (A) to the total amount of the ethylenic unsaturated compound included in the second ink is 5.0% by mass or more, and

(A)

wherein, in Formula (A), n represents an integer of 2 to 6.

<5> The ink set described in any one of <1> to <4>,
wherein the ethylenic unsaturated compound included in the first ink includes a silicone compound having an ethylenic unsaturated group, and
wherein the ethylenic unsaturated compound included in the second ink includes a silicone compound having an ethylenic unsaturated group.

<6> The ink set described in any one of <1> to <5>, wherein, when a viscosity of the first ink at 25° C. is defined as V1 and a viscosity of the second ink at 25° C. is defined as V2, a ratio of V1 to V2 is 2.0 to 20.0.

<7> The ink set described in any one of <1> to <6>, wherein a content of a thioxanthone compound in the first ink is 0.8% by mass or less of a total amount of the first ink.

<8> An image recording method in which the ink set described in any one of <1> to <7> is used, the method including:
a first application step of applying the first ink to an impermeable substrate;
a first irradiation step of irradiating the first ink deposited on the impermeable substrate with a first active energy ray at an irradiation dose of 1 to 50 mJ/cm$^2$;
a second application step of applying the second ink to the first ink irradiated with the first active energy ray; and
a second irradiation step of irradiating the second ink deposited on the impermeable substrate and the first ink irradiated with the first active energy ray with a second active energy ray at an irradiation dose of 100 mJ/cm$^2$ or more.

<9> A method for producing a three-dimensional article, the method including:
a step of producing an image recorded article including the impermeable substrate and an image by the image recording method described in <8>; and a step of subjecting the image recorded article to vacuum forming to produce a three-dimensional article.

<10> An image recorded article including:
an impermeable substrate; and
an image recorded using the ink set described in any one of <1> to <7>,
wherein the image includes a first layer that is a cured product of the first ink and a second layer that is a cured product of the second ink, and
wherein the impermeable substrate, the first layer, and the second layer are arranged in this order.

<11> A three-dimensional article that is an article produced by subjecting the image recorded article described in <10> to vacuum forming.

According to an aspect of the present disclosure, an ink set and an image recording method with which an image in which bleeding is unlikely to occur and which has excellent heat stretchability can be recorded, an image recorded article that includes the image, and a three-dimensional article that includes an image in which bleeding and cracking are unlikely to occur and a method for producing the three-dimensional article are provided.

BRIEF DESCRIPTION OF THE DRAWINGS

FIG. 1 is a schematic diagram illustrating a letter (i.e., letter formed using a second ink) used for evaluating the bleeding of an image in Examples of the present disclosure.

DESCRIPTION OF THE PREFERRED EMBODIMENTS

In the present disclosure, a numerical range expressed using "to" means the range specified by the lower and upper limits described before and after "to", respectively.

In the present disclosure, in the case where a composition includes a plurality of substances that correspond to a component of the composition, the content of the component in the composition is the total content of the substances in the composition unless otherwise specified.

In the present disclosure, when numerical ranges are described in a stepwise manner, the upper or lower limit of a numerical range may be replaced with the upper or lower limit of another numerical range, respectively, and may also be replaced with the values described in Examples below.

In the present disclosure, the term "step" refers not only to an individual step but also to a step that is not distinguishable from other steps but achieves the intended purpose of the step.

In the present disclosure, a combination of preferable aspects is a more preferable aspect.

In the present disclosure, the term "light" conceptually subsumes active energy rays, such as γ-radiation, β-radiation, an electron beam, ultraviolet radiation, and visible light.

In the present disclosure, ultraviolet radiation may be referred to as "ultraviolet (UV) light".

In the present disclosure, the concept of the term "(meth)acrylate" includes both acrylate and methacrylate, and the concept of the term "(meth)acryloyl group" includes both acryloyl and methacryloyl groups.

Ink Set

An ink set according to the present disclosure includes
a first ink including an ethylenic unsaturated compound and a photopolymerization initiator, the first ink not including a colorant or including a white colorant; and
a second ink including an ethylenic unsaturated compound, a photopolymerization initiator, and a colorant,
wherein the ethylenic unsaturated compound included in the first ink includes a monofunctional monomer that is a compound including one ethylenic unsaturated group, and the proportion of the amount of the monofunctional monomer to the total amount of the ethylenic unsaturated compound included in the first ink is 95.0% by mass or more,
wherein the ethylenic unsaturated compound included in the second ink includes a monofunctional monomer that is a compound including one ethylenic unsaturated group, and the proportion of the amount of the monofunctional monomer to the total amount of the ethylenic unsaturated compound included in the second ink is 95.0% by mass or more, and
wherein, when the static surface tension of the first ink at 25° C. is defined as T1 and the static surface tension of the second ink at 25° C. is defined as T2, the value calculated by subtracting T1 from T2 is 1 mN/m or more.

The ink set according to the present disclosure is used in image recording in which an image is recorded by applying a first ink to an impermeable substrate, irradiating the deposited first ink with an active energy ray to bring the first ink into a partially cured state, applying a second ink to the partially cured first ink, and irradiating the deposited second ink and the partially cured first ink with an active energy ray (i.e., the production of an image recorded article that includes an impermeable substrate and an image).

Note that the term "partially cured state" used herein refers to a state in which the ethylenic unsaturated compound included in the first ink is partially polymerized (e.g., the polymerization ratio described below is 80% or less) and the first ink is cured to a certain degree but is not cured at a sufficient degree.

Preferable aspects of the impermeable substrate and the partially cured state are described in the section "Image Recording Method" below.

In the present disclosure, the term "image" refers to a film that includes a first layer that is a cured product of the first ink and a second layer that is a cured product of the second ink and disposed on the first layer.

The concept of the term "image" includes a solid image (i.e., an image having a dot percent of 100%).

The use of the ink set according to the present disclosure enables an image in which bleeding is unlikely to occur and which has excellent heat stretchability to be recorded.

Specifically, since the proportion of the monofunctional monomer in the first ink included in the ink set according to the present disclosure is 95.0% by mass or more and the proportion of the monofunctional monomer in the second ink included in the ink set is 95.0% by mass or more, the heat stretchability of the recorded image is enhanced. That is, when an image recorded article produced using the ink set according to the present disclosure is subjected to heat stretching, the cracking of the image can be reduced.

Furthermore, since the value calculated by subtracting T1 from T2 (hereinafter, this value is referred to also as "difference in surface tension [T2−T1]") is 1 mN/m or more in the ink set according to the present disclosure, the bleeding of the recorded image (in particular, the bleeding of the second layer which results from the second ink) is reduced. This is presumably because, since the difference in surface tension [T2−T1] is 1 mN/m or more, the excessive spread of the second ink deposited on the partially cured first ink is suppressed.

Difference in Surface Tension (T2−T1)

As described above, the difference in surface tension (T2−T1) is 1 mN/m or more. This reduces the bleeding of the image.

In order to further reduce the graininess of the image, the difference in surface tension (T2−T1) is preferably 15 mN/m or less. When the difference in surface tension (T2−T1) is 15 mN/m or less, the graininess of the image is further reduced. This is presumably because the likelihood of the second ink deposited on the partially cured first ink failing to spread to a sufficient degree is further reduced.

Thus, in order to reduce the bleeding of the image and further reduce the graininess of the image, the difference in surface tension (T2−T1) is preferably 1 to 15 mN/m and is more preferably 2 to 10 mN/m.

T1 and T2

The static surface tension of the first ink at 25° C., T1, and the static surface tension of the second ink at 25° C., T2, are static surface tensions measured at 25° C. by the plate method using a surface tensiometer in units of mN/m.

T1 and T2 are each determined by rounding off a measured value to an integer.

The surface tensiometer used is, for example, an automatic surface tensiometer (product name: "CBVP-Z") produced by Kyowa Interface Science Co., Ltd.

T1 is preferably 60 mN/m or less, is more preferably 10 to 50 mN/m, and is further preferably 15 to 30 mN/m.

T2 is preferably 60 mN/m or less, is more preferably 10 to 50 mN/m, and is further preferably 20 to 45 mN/m.

Viscosity Ratio [V1/V2]

In the ink set according to the present disclosure, when the viscosity of the first ink at 25° C. is defined as V1 and the viscosity of the second ink at 25° C. is defined as V2, the ratio of V1 to V2 (in the present disclosure, this ratio is referred to also as "viscosity ratio [V1/V2]") is preferably 1.1 or more.

When the viscosity ratio [V1/V2] is 1.1 or more, the bleeding of the image is further reduced. This is presumably because the excessive spread of the second ink deposited on the partially cured first ink is suppressed. In order to further reduce the bleeding of the image, the viscosity ratio [V1/V2] is preferably 2.0 or more.

In order to further reduce the graininess of the image, the viscosity ratio [V1/V2] is preferably 22.0 or less. When the viscosity ratio [V1/V2] is 22.0 or less, the graininess of the image is further reduced. This is presumably because the likelihood of the second ink deposited on the partially cured first ink failing to spread to a sufficient degree is further reduced. In order to still further reduce the graininess of the image, the viscosity ratio [V1/V2] is preferably 20.0 or less.

As described above, in order to further reduce the bleeding and graininess of the image, the viscosity ratio [V1/V2] is preferably, for example, 2.0 to 20.0.

V1 and V2

The viscosity of the first ink at 25° C., V1, and the viscosity of the second ink at 25° C., V2, are viscosities measured at 25° C. with a viscometer in units of mPa·s.

V1 and V2 are each determined by rounding off a measured value to an integer.

The viscometer used is, for example, a viscometer TV-22 produced by Toki Sangyo Co., Ltd.

The above-described viscosity ratio [V1/V2] is determined by rounding off a calculated value to one decimal place.

V1 is preferably 2 to 130 mPa·s, is more preferably 10 to 130 mPa·s, is preferably 30 to 120 mPa·s, is further preferably 40 to 100 mPa·s, and is further preferably 40 to 80 mPa·s.

V2 is preferably 1 to 30 mPa·s, is more preferably 3 to 25 mPa·s, and is further preferably 5 to 20 mPa·s.

The first and second inks are described below.

First Ink

The ink set according to the present disclosure includes a first ink.

The first ink includes an ethylenic unsaturated compound and a photopolymerization initiator. The first ink does not include a colorant or includes a white colorant.

The number of types of the first inks included in the ink set according to the present disclosure may be only one or two or more.

Examples of the first ink include a clear ink (i.e., a first ink that does not include a colorant) and a white ink (i.e., a first ink that includes a white colorant).

Ethylenic Unsaturated Compound

The first ink includes at least one ethylenic unsaturated compound.

In the present disclosure, the term "ethylenic unsaturated compound" refers to a compound that includes an ethylenic unsaturated group.

In the present disclosure, the term "ethylenic unsaturated group" refers to a group that includes an ethylenic double bond.

The ethylenic unsaturated group is preferably a (meth) acryloyl group, a vinyl group, an allyl group, or a styryl group and is more preferably a (meth)acryloyl group or a vinyl group.

The number of the ethylenic unsaturated groups included in the ethylenic unsaturated compound may be only one or two or more.

The number of the types of the ethylenic unsaturated groups included in the ethylenic unsaturated compound may be only one or two or more.

Monofunctional Monomer

The ethylenic unsaturated compound included in the first ink includes at least one monofunctional monomer.

The term "monofunctional monomer" used herein refers to a compound that includes one ethylenic unsaturated group.

The proportion of the amount of the monofunctional monomer to the total content of the ethylenic unsaturated compound in the first ink is 95.0% by mass or more. This enhances the heat stretchability of the image.

In order to further enhance the heat stretchability of the image, the above proportion of the amount of the monofunctional monomer is preferably 96.0% by mass or more, is more preferably 97.0% by mass or more, and is further preferably 98.0% by mass or more.

The proportion of the amount of the monofunctional monomer may be 100% by mass. In order to further reduce the blocking of the image, the proportion of the amount of the monofunctional monomer is preferably 99% by mass or less.

The proportion of the amount of the monofunctional monomer being 99% by mass or less means that the proportion of the amount of a polyfunctional monomer (i.e., a compound that includes two or more ethylenic unsaturated groups) to the total content of the ethylenic unsaturated compound in the first ink is 1% by mass or more.

The content of the monofunctional monomer in the first ink is preferably 50% by mass or more and is more preferably 60% by mass or more of the total amount of the first ink.

Examples of the monofunctional monomer include a monofunctional (meth)acrylate, a monofunctional (meth)acrylamide, a monofunctional aromatic vinyl compound, a monofunctional vinyl ether, and a monofunctional N-vinyl compound.

Examples of the monofunctional (meth)acrylate include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethylcarbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, cyclic trimethylolpropane formal (meth)acrylate, phenyl glycidyl ether (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethyl succinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of the monofunctional (meth)acrylamide include (meth)acrylamide, N-methyl(meth)acrylamide, N-ethyl(meth)acrylamide, N-propyl(meth)acrylamide, N-n-butyl(meth)acryl amide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide, and (meth)acryloylmorpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxy styrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include the compound represented by Formula (A) which is described below.

The molecular weight of the monofunctional monomer is preferably 1000 or less, is more preferably 500 or less, is further preferably 300 or less, and is further preferably 210 or less.

The lower limit for the molecular weight of the monofunctional monomer is, for example, 50, 60, or 70.

The monofunctional monomer included in the first ink preferably includes the monofunctional (meth)acrylate in order to further enhance the heat stretchability of the image.

The proportion of the amount of the monofunctional (meth)acrylate to the total content of the ethylenic unsaturated compound in the first ink is preferably 50% by mass or more, is more preferably 60% by mass or more, and is further preferably 70% by mass or more in order to further enhance the heat stretchability of the image.

The proportion of the amount of the monofunctional (meth)acrylate to the total content of the ethylenic unsaturated compound in the first ink may be 100% by mass and may be less than 100% by mass.

The proportion of the monofunctional (meth)acrylate to the monofunctional monomer is preferably 50% by mass or more, is more preferably 60% by mass or more, and is further preferably 70% by mass or more in order to further enhance the heat stretchability of the image.

The proportion of the monofunctional (meth)acrylate to the monofunctional monomer may be 100% by mass and may be less than 100% by mass.

The monofunctional monomer included in the first ink preferably includes the compound represented by Formula (A) below in order to further reduce the blocking of the image.

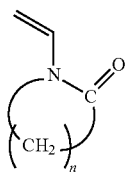

(A)

In Formula (A), n represents an integer of 2 to 6.

In Formula (A), n is preferably an integer of 3 to 5.

Examples of the compound represented by Formula (A) include N-vinyl-ε-caprolactam (compound represented by Formula (A) in which n is 5) and N-vinylpyrrolidone (compound represented by Formula (A) in which n is 3).

The proportion of the amount of the compound represented by Formula (A) to the total content of the ethylenic unsaturated compound included in the first ink is preferably 2.0% by mass or more, is more preferably 5.0% by mass or more, is further preferably 10% by mass or more, and is further preferably 15% by mass or more in order to further reduce the blocking of the image.

The upper limit for the proportion of the amount of the compound represented by Formula (A) to the total content of the ethylenic unsaturated compound included in the first ink is preferably 50% by mass, is more preferably 40% by mass, and is further preferably 30% by mass.

The proportion of the compound represented by Formula (A) to the monofunctional monomer is preferably 2.0% by mass or more, is more preferably 5.0% by mass or more, is further preferably 10% by mass or more, and is further preferably 15% by mass or more.

The upper limit for the proportion of the compound represented by Formula (A) to the monofunctional monomer is preferably 50% by mass, is more preferably 40% by mass, and is further preferably 30% by mass.

The glass transition temperature of a homopolymer of the monofunctional monomer is preferably −40° C. to 90° C., is more preferably −40° C. to 80° C., is further preferably −40° C. to 50° C., and is more preferably 0° C. to 30° C. When the above glass transition temperature is −40° C. or more, the blocking of the recorded image is further reduced. When the above glass transition temperature is 90° C. or less, the flexibility of the recorded image is further enhanced.

In the case where the first ink includes a plurality of monofunctional monomers, it is preferable that the average of the glass transition temperatures of the homopolymers of the monofunctional monomers fall within the above range. Specifically, the glass transition temperatures of homopolymers of the monofunctional monomers included in the first ink are measured, and the average of the measured values is calculated. The calculated value preferably falls within the above range.

The glass transition temperature of a homopolymer of the monofunctional monomer is measured by the following method. First, a homopolymer having a weight-average molecular weight of 10,000 to 20,000 is produced using the monofunctional monomer. The glass transition temperature of the homopolymer is measured in accordance with the method described in JIS K7121:2012.

The glass transition temperature is measured using a differential scanning calorimeter, such as product name: "DSC-60" produced by Shimadzu Corporation.

The weight-average molecular weight is measured by gel permeation chromatography (GPC). For example, HLC-8220GPC (produced by Tosoh Corporation) is used as GPC, 3 columns: TSKgel Super Multipore HZ-H (produced by Tosoh Corporation, 4.6 mm ID×15 cm) are used as columns, and tetrahydrofuran (THF) is used as an eluant. The detection is conducted under the following conditions: sample concentration: 0.45% by mass, flow rate: 0.35 ml/min, sample injection volume: 10 temperature: 40° C., detector: refractive index (RI) detector. A calibration curve is prepared using the following eight samples as reference materials: product name "TSK Standard Polystyrene": "F-40", "F-20", "F-4", "F-1", "A-5000", "A-2500", "A-1000", and "n-propylbenzene" produced by Tosoh Corporation. Although the glass transition temperature of a homopolymer varies by the weight-average molecular weight of the homopolymer, the variation is negligibly small when the weight-average molecular weight is 10,000 to 20,000.

Polyfunctional Monomer

The ethylenic unsaturated compound included in the first ink may include at least one polyfunctional monomer in order to further reduce the blocking of the recorded image The term "polyfunctional monomer" used herein refers to a compound that includes two or more ethylenic unsaturated groups.

Examples of the polyfunctional monomer include a polyfunctional (meth)acrylate and a polyfunctional vinyl ether.

Examples of the polyfunctional (meth)acrylate include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, tricyclodecanedimethanol di(meth)acrylate, trimethylolethane tri(meth)acrylate, trimethylolpropane tri(meth)acrylate, trimethylolpropane EO-adduct tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, and tris(2-acryloyloxyethyl)isocyanurate.

The polyfunctional (meth)acrylate may be a urethane (meth)acrylate that is a product of the reaction between a difunctional isocyanate compound and a hydroxyl group-containing polyfunctional (meth)acrylate. Examples of the difunctional isocyanate compound include the above-described compounds. Examples of the hydroxyl group-containing polyfunctional (meth)acrylate include phenyl glycidyl ether (meth)acrylate, pentaerythritol tri(meth)acrylate, and dipentaerythritol penta(meth)acrylate.

The polyfunctional (meth)acrylate may also be an epoxy (meth)acrylate that is a product of the reaction between (meth)acrylic acid and an epoxy resin. Examples of the epoxy resin include a bisphenol A epoxy resin and a cresol novolac epoxy resin.

Examples of the polyfunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-adduct trimethylolpropane trivinyl ether, PO-adduct trimethylolpropane trivinyl ether, EO-adduct ditrimethylolpropane tetravinyl ether, PO-adduct ditrimethylolpropane tetravinyl ether, EO-adduct pentaerythritol tetravinyl ether, PO-adduct pentaerythritol tetravinyl ether, EO-adduct dipentaerythritol hexavinyl ether, and PO-adduct dipentaerythritol hexavinyl ether.

The polyfunctional monomer is preferably the polyfunctional (meth)acrylate in order to further reduce the blocking of the recorded image.

Silicone Compound Having Ethylenic Unsaturated Group

The ethylenic unsaturated compound included in the first ink may include at least one silicone compound having an ethylenic unsaturated group in order to further reduce the blocking of the recorded image.

The silicone compound having an ethylenic unsaturated group may be either a monofunctional monomer or a polyfunctional monomer and is preferably a polyfunctional monomer.

The silicone compound having an ethylenic unsaturated group is preferably a silicone polyether acrylate, is more preferably a polyfunctional silicone polyether acrylate, and is further preferably a penta or hexafunctional silicone polyether acrylate.

The proportion of the amount of the silicone compound having an ethylenic unsaturated group to the total content of the ethylenic unsaturated compound in the first ink is preferably 0.2% by mass or more, is more preferably 0.5% by mass or more, and is further preferably 0.8% by mass or more in order to further reduce the blocking of the image.

The upper limit for the proportion of the amount of the silicone compound having an ethylenic unsaturated group to the total content of the ethylenic unsaturated compound in the first ink is preferably 10% by mass, is more preferably 5.0% by mass, and is further preferably 3.0% by mass.

The total content of the ethylenic unsaturated compound in the first ink is preferably 50% by mass or more, is more preferably 60% by mass or more, and is further preferably 75% by mass or more of the total amount of the first ink.

Photopolymerization Initiator

The first ink includes at least one photopolymerization initiator.

The photopolymerization initiator is preferably a radical polymerization initiator that generates radicals upon being irradiated with light.

Examples of the radical polymerization initiator include (a) an alkylphenone compound, (b) an acylphosphine oxide compound, (c) an aromatic onium salt compound, (d) an organic peroxide, (e) a thio compound (e.g., a thioxanthone compound), (f) a hexaarylbiimidazole compound, (g) a ketoxime ester compound, (h) a borate compound, (i) an azinium compound, (j) a metallocene compound, (k) an active ester compound, (l) a compound including a carbon-halogen bond, and (m) an alkylamine compound.

The photopolymerization initiator included in the first ink preferably includes an acylphosphine oxide compound.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, bis(2,6-dimethoxybenzoyl)-2,4,4-trimethylpentylphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Among these, bis(2,4,6-trimethylbenzoyl)phenylphosphine oxide and 2,4,6-trimethylbenzoyldiphenylphosphine oxide are preferable and bis(2,4,6-trimethylbenzoyl)phenylphosphine oxide is more preferable as an acylphosphine oxide compound.

Bis(2,4,6-trimethylbenzoyl)phenylphosphine oxide is available from IGM Resins B.V. as product name: "Omnirad 819".

The content of the photopolymerization initiator in the first ink is preferably 1.0% to 15.0% by mass, is more preferably 1.5% to 10.0% by mass, and is further preferably 2.0% to 6.0% by mass of the total amount of the first ink.

In order to further reduce the graininess of the recorded image, the content of the thioxanthone compound in the first ink is preferably 1.0% by mass or less, is more preferably 0.8% by mass or less, is further preferably less than 0.8% by mass, and is further preferably 0.5% by mass or less of the total amount of the first ink.

In order to further reduce the graininess of the recorded image, it is also preferable that the content of the thioxanthone compound in the first ink be 0% by mass of the total amount of the first ink (i.e., it is also preferable that the first ink do not include the thioxanthone compound).

Colorant

The first ink does not include a colorant or includes a white colorant.

In the case where the first ink does not include a colorant, the first ink is a clear ink.

In the case where the first ink includes a white colorant, the first ink is typically a white ink.

White Colorant

The white colorant is preferably a white pigment.

Titanium dioxide, calcium carbonate, barium sulfate, or the like can be used as a white pigment in accordance with the intended purpose.

In the case where the first ink includes a white colorant, the content of the white colorant in the first ink is selected appropriately in accordance with the intended purpose and is preferably 0.01% to 30% by mass of the total amount of the first ink.

Dispersant

In the case where a white pigment is used as a white colorant that may be included in the first ink, the first ink may include a dispersant for the white pigment.

The dispersant is preferably a high molecular weight dispersant.

The term "high molecular weight dispersant" used herein refers to a dispersant having a weight-average molecular weight of 1,000 or more.

Examples of the high molecular weight dispersant include:

DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (the above are produced by BYK Chemie);

EFKA 4010, EFKA 4046, EFKA 4080, EFKA 5010, EFKA 5207, EFKA 5244, EFKA 6745, EFKA 6750, EFKA 7414, EFKA 745, EFKA 7462, EFKA 7500, EFKA 7570, EFKA 7575, and EFKA 7580 (the above are produced by Efka Additive);

DISPERAID 6, DISPERAID 8, DISPERAID 15, and DISPERAID 9100 (the above are produced by San Nopco Ltd.);

SOLSPERSE dispersants, such as SOLSPERSE 3000, 5000, 9000, 12000, 13240, 13940, 17000, 22000, 24000, 26000, 28000, 32000, 36000, 39000, 41000, and 71000 (the above are produced by Noveon);

Adeka Pluronic L31, F38, L42, L44, L61, L64, F68, L72, P95, F77, P84, F87, P94, L101, P103, F108, L121, and P-123 (produced by ADEKA CORPORATION) and IONET S-20 (the above are produced by Sanyo Chemical Industries, Ltd.); and DISPERLON KS-860, 873SN, 874 (high molecular weight dispersant), #2150 (aliphatic polyvalent carboxylic acid), and #7004 (polyether ester type) (the above are produced by Kusumoto Chemicals, Ltd.).

In the case where the first ink includes the dispersant, the content of the dispersant in the first ink is selected appropriately in accordance with the intended purpose and is preferably 0.05% to 15% by mass of the total amount of the first ink.

Polymer

The first ink preferably includes at least one polymer.

In the case where the first ink includes a polymer, the viscosity of the first ink can be increased and, consequently, the bleeding of the image (specifically, the bleeding of the second layer which results from the second ink) is further reduced.

Examples of the polymer include an acrylic polymer, a urethane polymer, a polyester polymer, a polyolefin polymer, an amide polymer, and a cellulose polymer.

The polymer is preferably an acrylic polymer.

The weight-average molecular weight of the polymer is preferably 5,000 to 100,000, is more preferably 10,000 to 100,000, and is further preferably 20,000 to 80,000.

The weight-average molecular weight of the polymer is measured by GPC. The conditions under which the GPC measurement is conducted are as described above.

The content of the polymer in the first ink is 1% to 25% by mass, is more preferably 3% to 20% by mass, and is further preferably 5% to 15% by mass of the total amount of the first ink.

Surfactant

The first ink may include at least one surfactant.

The surfactant is preferably a silicone surfactant (except the above-described silicone compound having an ethylenic unsaturated group).

Examples of the silicone surfactant include a polysiloxane compound. The silicone surfactant is preferably a modified polysiloxane compound formed as a result of an organic group being introduced to a part of the methyl groups included in dimethylpolysiloxane. Examples of the type of modification include polyether modification, methylstyrene modification, alcohol modification, alkyl modification, aralkyl modification, fatty acid ester modification, epoxy modification, amine modification, amino modification, and mercapto modification. Alternatively, a plurality of types of organic groups may be introduced to a part of the methyl groups included in dimethylpolysiloxane.

In particular, in consideration of ejection consistency, the silicone surfactant is preferably a polyether-modified polysiloxane compound.

In the case where the first ink includes the surfactant, the content of the surfactant is preferably 0.001% to 4.0% by mass, is more preferably 0.01% to 3.0% by mass, and is further preferably 0.05% to 2.0% by mass of the total amount of the first ink.

Polymerization Inhibitor

The first ink may include at least one polymerization inhibitor.

Examples of the polymerization inhibitor include p-methoxyphenol, a quinone (e.g., hydroquinone, benzoquinone, or methoxybenzoquinone), phenothiazine, a catechol, an alkylphenol (e.g., dibutylhydroxytoluene (BHT)), an alkylbisphenol, zinc dimethyldithiocarbamate, copper dimethyldithiocarbamate, copper dibutyldithiocarbamate, copper salicylate, a thiodipropionic acid ester, mercaptobenzimidazole, a phosphite, 2,2,6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine) aluminum salt (also known as: Cupferron A1).

Among these, at least one selected from p-methoxyphenol, a catechol, a quinone, an alkylphenol, TEMPO, TEMPOL, and tris(N-nitroso-N-phenylhydroxylamine) aluminum salt is preferable, and at least one selected from p-methoxyphenol, hydroquinone, benzoquinone, BHT, TEMPO, TEMPOL, and tris(N-nitroso-N-phenylhydroxylamine) aluminum salt is more preferable.

In the case where the first ink includes the polymerization inhibitor, the content of the polymerization inhibitor is preferably 0.01% to 2.0% by mass, is more preferably 0.02% to 1.0% by mass, and is particularly preferably 0.03% to 0.5% by mass of the total amount of the first ink.

Other Components

The first ink may optionally include other components, such as a cosensitizing agent, an ultraviolet absorber, an antioxidant, an antitarnish agent, a conductive salt, a solvent, and a basic compound, as needed.

The above-described first ink is preferably, but not limited to, a coating ink or a printing ink and is more preferably a coating ink or a flexographic ink.

Second Ink

The ink set according to the present disclosure includes a second ink.

The second ink includes an ethylenic unsaturated compound, a photopolymerization initiator, and a colorant.

The number of the types of the second inks included in the ink set according to the present disclosure may be only one and may be two or more.

Examples of the second ink include a cyan ink, a magenta ink, a yellow ink, a black ink, and a white ink.

Ethylenic Unsaturated Compound

The second ink includes at least one ethylenic unsaturated compound.

The ethylenic unsaturated compound included in the second ink includes at least one monofunctional monomer.

The proportion of the amount of the monofunctional monomer to the total content of the ethylenic unsaturated compound in the second ink is 95.0% by mass or more. This enhances the heat stretchability of the image.

The preferable aspect of the ethylenic unsaturated compound included in the second ink is the same as the preferable aspect of the ethylenic unsaturated compound included in the first ink.

As for the preferable aspect of the ethylenic unsaturated compound included in the second ink, reference can be made to the description of the section "Ethylenic Unsaturated Compound" of the above-described first ink. In this case, the term "first ink" used in the description of the section "Ethylenic Unsaturated Compound" of the above-described first ink shall be read as "second ink".

Note that the ethylenic unsaturated compound included in the second ink may be identical to or different from the ethylenic unsaturated compound included in the first ink.

For example, the monofunctional monomer included in the second ink preferably includes a monofunctional (meth)acrylate compound in order to further enhance the heat stretchability of the image. The preferable aspect and preferable content of the monofunctional (meth)acrylate compound that may be included in the second ink are the same as the preferable aspect and preferable content of the monofunctional (meth)acrylate compound that may be included in the first ink. Note that the monofunctional (meth)acrylate compound that may be included in the second ink may be identical to or different from the monofunctional (meth)acrylate compound that may be included in the first ink.

The monofunctional monomer included in the second ink preferably includes the above-described compound represented by Formula (A) in order to further reduce the blocking of the image. The preferable aspect and preferable content of the compound represented by Formula (A) which may be included in the second ink are the same as the preferable aspect and preferable content of the compound represented by Formula (A) which may be included in the first ink. Note that the compound represented by Formula (A) which may be included in the second ink may be identical to or different from the compound represented by Formula (A) which may be included in the first ink.

The ethylenic unsaturated compound included in the second ink preferably includes a silicone compound having an ethylenic unsaturated group in order to further reduce the blocking of the image. The preferable aspect and preferable content of the silicone compound having an ethylenic unsaturated group which may be included in the second ink are the same as the preferable aspect and preferable content of the silicone compound having an ethylenic unsaturated group which may be included in the first ink. Note that the silicone compound having an ethylenic unsaturated group which may be included in the second ink may be identical to or different from the silicone compound having an ethylenic unsaturated group which may be included in the first ink.

Photopolymerization Initiator

The second ink includes at least one photopolymerization initiator.

Examples of the photopolymerization initiator included in the second ink are the same as those of the photopolymerization initiator included in the first ink. Note that the photopolymerization initiator included in the second ink may be identical to or different from the photopolymerization initiator included in the first ink.

The photopolymerization initiator included in the second ink preferably includes an acylphosphine oxide compound and a thio compound in order to further enhance the curability of the second ink.

The preferable aspect of the acylphosphine oxide compound that may be included in the second ink is the same as the preferable aspect of the acylphosphine oxide compound that may be included in the first ink. Note that the acylphosphine oxide compound that may be included in the second ink may be identical to or different from the acylphosphine oxide compound that may be included in the first ink.

The thio compound is preferably a thioxanthone compound.

Examples of the thioxanthone compound include thioxanthone, 2-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(methoxyethoxycarbonyl)thioxanthone, 4-butoxycarbonylthioxanthone, 3-butoxycarbonyl-7-methylthioxanthone, 1-cyclo-3-chloroxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(methoxyethoxy)ethoxycarbonyl)]thioxanthone], 1-ethoxycarbonyl-3-(1-methyl-1-morpholinoethyl)thioxanthone], 2-methyl-6-dimethoxymethylthioxanthone, 2-methyl-6-(1,1-dimethoxybenzylthioxanthone, 2-morpholinomethylthioxanthone, 2-methyl-6-morpholinomethylthioxanthone, N-allylthioxanthone-3,4-dicarboxyimide, N-octylthioxanthone-3,4-dicarboxyimide, N-(1,1,3,3-tetramethylbutyl)-thioxanthone-3,4-dicarboxyimide, 1-phenoxythioxanthone, 6-ethoxycarbonyl-1-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride, n-dodecyl-7-methyl-thioxanthone-3-carboxylate, and N,N-diisobutyl-7-methyl-thioxanthone-3-carbamide.

The content of the photopolymerization initiator in the second ink is preferably 1.0% to 15.0% by mass, is more preferably 1.5% to 10.0% by mass, and is further preferably 2.0% to 6.0% by mass of the total amount of the second ink.

The mass ratio of the thio compound to the acylphosphine oxide compound in the photopolymerization initiator included in the second ink (mass ratio [Thio compound/Acylphosphine oxide compound]) is preferably 0.1 to 1.0, is more preferably 0.2 to 0.9, and is further preferably 0.3 to 0.7.

Colorant

The second ink includes at least one colorant.

The colorant included in the second ink may be either a dye or a pigment and is preferably a pigment in consideration of fastness and the like.

The colorant included in the second ink may be appropriately selected from the pigments described in Paragraphs 0096 to 0100 of JP2009-241586A.

The colorant included in the second ink may be any of a colorant of a chromatic color, a black colorant, and a white colorant.

The second ink may include two or more types of colorants selected from the group consisting of a colorant of a chromatic color, a black colorant, and a white colorant.

Examples of the colorant of a chromatic color include an azo pigment, polycyclic pigments (e.g., a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, and a quinophthalone pigment), a dye chelate, a nitro pigment, a nitroso pigment, iron oxide, barium yellow, cadmium red, and chrome yellow.

Examples of the chromatic color include cyan, magenta, yellow, blue, red, green, orange, and violet.

Only one colorant of a chromatic color may be used alone. Two or more colorants of chromatic colors may be used in combination.

Examples of the Black Colorant Include Carbon Black and Aniline Black.

Only one black colorant may be used alone. Two or more black colorants may be used in combination.

Examples of the white colorant include the white pigment described in the section of First Ink.

Only one white colorant may be used alone. Two or more white colorants may be used in combination.

In order to enable the reduction in the bleeding of the image to be visually confirmed in a further effective manner, the combination of the first and second inks included in the ink set according to the present disclosure is preferably the combination of a first ink that does not include a colorant (i.e., clear ink) and a second ink that includes at least one selected from the group consisting of a colorant of a chromatic color, a black colorant, and a white colorant, or the combination of a first ink that includes a white colorant (e.g., white ink) and a second ink that includes at least one selected from the group consisting of a colorant of a chromatic color and a black colorant.

The content of the colorant in the second ink is preferably 1% to 20% by mass, is more preferably 1% to 15% by mass, and is further preferably 1% to 10% by mass of the total amount of the second ink.

Dispersant

In the case where the colorant included in the second ink is a pigment, the second ink may include a dispersant.

Examples of the dispersant that may be included in the second ink are the same as those of the dispersant that may be included in the first ink. The same applies to the preferable aspect (e.g., preferable content) thereof.

Polymer

The second ink may include a polymer that is the same as the polymer that may be included in the first ink.

However, in order to further reduce the likelihood of the viscosity of the second ink being excessively increased, the content of the polymer in the second ink is preferably less than 3.0% by mass and is more preferably less than 1.5% by mass of the total amount of the second ink. In order to further reduce the likelihood of the viscosity of the second ink being excessively increased, the second ink does not necessarily include the polymer.

Surfactant

The second ink may include at least one surfactant.

Examples of the surfactant that may be included in the second ink are the same as those of the surfactant that may be included in the first ink. The same applies to the preferable aspect (e.g., preferable content) thereof.

Polymerization Inhibitor

The second ink may include at least one polymerization inhibitor.

Examples of the polymerization inhibitor that may be included in the second ink are the same as those of the polymerization inhibitor that may be included in the first ink. The same applies to the preferable aspect (e.g., preferable content) thereof.

Other Components

The second ink may optionally include other components, such as a cosensitizing agent, an ultraviolet absorber, an antioxidant, an antitarnish agent, a conductive salt, a solvent, and a basic compound, as needed.

The above-described second ink is preferably, but not limited to, an ink jet ink in order to form a high-definition image (second layer).

Image Recording Method

An image recording method according to an example of the present disclosure is described below.

In the image recording method according to an example of the present disclosure, the above-described ink set according to the present disclosure is used. The image recording method includes:

a first application step of applying the first ink to an impermeable substrate;

a first irradiation step of irradiating the first ink deposited on the impermeable substrate with a first active energy ray at an irradiation dose of 1 to 50 $mJ/cm^2$;

a second application step of applying the second ink to the first ink irradiated with the first active energy ray; and a second irradiation step of irradiating the second ink deposited on the impermeable substrate and the first ink irradiated with the first active energy ray with a second active energy ray at an irradiation dose of 100 $mJ/cm^2$ or more.

In the image recording method according to this example, the first ink applied to an impermeable substrate in the first application step is irradiated with a first active energy ray in the first irradiation step to be brought into the partially cured state described above.

In the second application step, a second ink is applied to the first ink that has been irradiated with the first active energy ray (i.e., to the partially cured first ink).

In the second irradiation step, the second ink deposited on the impermeable substrate and the partially cured first ink are irradiated with a second active energy ray in order to bring the first and second inks into a sufficiently cured state.

In the image recording method according to this example, an image (i.e., a film that includes a first layer that is a cured product of the first ink and a second layer that is cured product of the second ink and disposed on the first layer) is recorded on an impermeable substrate in the above-described manner.

In other words, in the image recording method according to this example, an image recorded article that includes the impermeable substrate and the image is produced.

In the recorded image, the occurrence of bleeding is reduced. Furthermore, the recorded image has excellent heat stretchability.

In the present disclosure, the partially cured state is preferably a state in which the polymerization ratio of the ethylenic unsaturated compound included in the ink is 80% or less.

The above polymerization ratio in the partially cured state is preferably 10% or more.

In the present disclosure, the sufficiently cured state is preferably a state in which the above polymerization ratio is more than 80% and 100% or less, is more preferably a state in which the above polymerization ratio is 85% to 100%, and is further preferably a state in which the above polymerization ratio is 90% to 100%.

The above polymerization ratio is calculated by the following method.

A sample piece having a size of 20 mm×50 mm is taken from a film formed by applying the ink to an impermeable substrate and then performing irradiation with an active energy ray (hereinafter, this sample piece is referred to as "irradiated sample piece"). The irradiated sample piece is immersed in 10 mL of tetrahydrofuran (THF) for 24 hours to prepare an elution solution that includes a component eluted from the ink. This elution solution is subjected to high-performance liquid chromatography in order to measure the amount of ethylenic unsaturated compound (hereinafter, referred to as "X1").

The same operation as described above is conducted except that irradiation with an active energy ray is not performed after the ink has been applied to an impermeable substrate, and the amount of ethylenic unsaturated compound (hereinafter, referred to as "X2") is measured. The polymerization ratio is calculated from X1 and X2 using the following equation.

$$\text{Polymerization ratio (\%)} = \{(X2-X1)/X2\} \times 100$$

Impermeable Substrate

In the present disclosure, the term "impermeable substrate" refers to a substrate the water absorption (% by mass, 24 hr) of which measured in accordance with ASTM D570 of ASTM test methods is less than 0.2.

Examples of the impermeable substrate include glass, quartz, and a plastic film.

Examples of the resin constituting the plastic film include cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene (PS), polystyrene, polypropylene (PP), a polycycloolefin resin, a polyimide resin, a polycarbonate (PC) resin, and polyvinyl acetal.

The plastic film may be a film that includes only one of the above resins and may be a film that includes two or more of the above resins.

The thickness of the impermeable substrate is preferably, but not limited to, 10 to 2000 μm, is more preferably 20 to 1000 μm, is further preferably 30 to 500 μm, and is particularly preferably 30 to 400 μm.

The Impermeable Substrate May be a Commercial Product.

Examples of commercial products of the impermeable substrate include the following commercial products.

Examples of the commercial products that are PP substrates include PYLEN Film 1146 (produced by Toyobo Co., Ltd.) and PURETHERMO AG-356AS (produced by Idemitsu Unitech Co., Ltd.).

Examples of the commercial products that are PE substrates include LIX Film L6100 (produced by Toyobo Co., Ltd.).

Examples of the commercial products that are PC substrates include Panlite PC-2151 (produced by Teijin Limited) and Technolloy C000 (produced by Sumitomo Chemical Co., Ltd.).

Examples of the commercial products that are PET substrates include Lumirror T60 (produced by Toray Industries, Inc.) and COSMOSHINE A4100 (produced by Toyobo Co., Ltd.).

Examples of the commercial products that are composed of polymethyl methacrylate (PMMA), which is a typical acrylic resin, include ACRYPLEN HBA002P (produced by Mitsubishi Chemical Corporation) and Technolloy S001G (produced by Sumitomo Chemical Co., Ltd.).

First Application Step

The first application step is a step of applying the first ink to an impermeable substrate.

In the case where the ink set according to the present disclosure includes two or more types of first inks, two or more types of first inks may be applied in the first application step.

The application of the first ink can be done by a known method, such as a coating method, an immersion method, or a printing method.

Examples of the apparatus used in the coating method include a bar coater, an extrusion coater, an air doctor coater, a blade coater, a rod coater, a knife coater, a squeeze coater, a reverse roll coater, a transfer roll coater, a gravure coater, a kiss roll coater, a cast coater, a spray coater, a curtain coater, and an extrusion coater.

Examples of the printing method include a gravure printing method, an offset printing method, a flexographic printing method, and an ink jet method.

The method used for the application of the first ink is preferably a coating method or a flexographic printing method.

The region to which the first ink is applied is preferably the same as or wider than the region to which the second ink is applied.

It is preferable that the first ink be applied at a dot percent of 80% to 100%.

The thickness of the first layer that is a cured product of the first ink is preferably 0.5 to 6.0 μm and is more preferably 2.0 to 4.0 μm.

First Irradiation Step

The first irradiation step is a step of irradiating the first ink deposited on the impermeable substrate with a first active energy ray at an irradiation dose of 1 to 50 $mJ/cm^2$.

Examples of the first active energy ray include ultraviolet radiation, visible light, and an electron beam. Among these, ultraviolet radiation (hereinafter, referred to also as "UV") is preferable.

The peak wavelength of ultraviolet radiation is preferably, for example, 200 to 405 nm, is more preferably 250 to 400 nm, and is further preferably 300 to 400 nm.

The light sources commonly used for ultraviolet irradiation are a mercury lamp, a gas laser, and a solid-state laser. A mercury lamp, a metal halide lamp, and an ultraviolet fluorescent lamp are broadly known. Compact, long-life, high-efficiency, and low-cost UV-light-emitting diodes (LEDs) and UV-laser diodes (LDs) are considered as promising light sources for ultraviolet irradiation. In particular, the light source for ultraviolet irradiation is preferably a metal halide lamp, a high-pressure mercury lamp, a medium-pressure mercury lamp, a low-pressure mercury lamp, or a UV-LED.

The irradiation dose (hereinafter, referred to also as "amount of exposure") of the first active energy ray is 1 to 50 $mJ/cm^2$, as described above.

This makes it easy to bring the first ink into the partially cured state.

The irradiation dose of the first active energy ray is preferably 3 to 40 $mJ/cm^2$, is more preferably 5 to 30 $mJ/cm^2$, and is further preferably 10 to 30 $mJ/cm^2$.

Second Application Step

The second application step is a step of applying the second ink to the first ink that has been irradiated with the first active energy ray.

In the case where the ink set according to the present disclosure includes two or more types of second inks, two or more types of second inks may be applied in the second application step.

The application of the second ink is preferably done by an ink jet method.

The type of the ink jet recording performed by the ink jet method is not limit, and any ink jet recording with which an image can be recorded may be used. Any of the known methods, such as a charge control ink jet method in which an electrostatic attractive force is used for ejecting an ink, a drop-on-demand (pressure pulse) ink jet method in which the vibration pressure of a piezoelectric element is used, an acoustic ink jet method in which an electrical signal is converted into an acoustic beam, an ink is irradiated with the acoustic beam, and the ink is ejected using the resulting radiation pressure, and a thermal ink jet (Bubble Jet (registered trademark)) method in which an ink is heated to form bubbles and the resulting pressure is used, may be used.

As an ink jet recording method, in particular, the method described in JP1979-59936A (JP-S54-59936A), in which the volume of an ink is quickly changed upon a heat energy being applied to the ink and the ink is ejected from a nozzle by the force generated due to the state change, can be effectively used.

As for an ink jet recording method, reference can be made also to the method described in Paragraphs 0093 to 0105 of JP2003-306623.

Examples of the ink jet recording method include a shuttle-type ink jet recording method in which a short serial head is used and recording is performed while the head is moved in the width direction of a substrate and a line-type (hereinafter, referred to also as "single pass system") ink jet recording method in which a line head that includes recording elements arranged to cover the entirety of a side of a substrate is used.

In the single pass system, a pattern can be formed over the entire surface of a substrate by scanning the substrate in a direction orthogonal to the direction in which the recording elements are arranged. This eliminates the need to use a transporting system for moving the short head, such as a carriage. In addition, it becomes not necessary to perform a complex control over the movement of the carriage and the scanning of the substrate. That is, only the substrate is moved. This increases the recording speed compared with the shuttle system.

In general, in the single pass system, the recording speed can be increased but the bleeding of the image is likely to occur compared with the shuttle system. However, in the case where the ink set according to the present disclosure is used, the bleeding of the image can be reduced even in the case where the single pass system ink jet recording method is used. In other words, in the case where the single pass system ink jet recording method is used, the advantageous effect of the ink set according to the present disclosure, that is, the reduction in the bleeding of the image, is achieved with further effect.

The amount of droplets of the second ink which are ejected from an ink jet head is preferably 1 to 100 pL (picoliter), is more preferably 3 to 80 pL, and is further preferably 3 to 50 pL.

When the second ink is ejected, an ink jet head is preferably heated in consideration of ejection consistency. It is preferable to heat the ink jet head to 40° C. to 70° C.

Second Irradiation Step

The second irradiation step is a step of irradiating the second ink deposited on the impermeable substrate and the first ink that has been irradiated with the first active energy ray with a second active energy ray at an irradiation dose of 100 mJ/cm$^2$ or more.

By this step, the second ink deposited on the impermeable substrate and the first ink that has been irradiated with the first active energy ray (i.e., partially cured first ink) are cured to a sufficient degree. As a result, an image that includes a first layer that is a cured product of the first ink and a second layer that is a cured product of the second ink is formed.

The preferable aspect of the second active energy ray (including the preferable aspect of the light source) is the same as the preferable aspect of the first active energy ray (including the preferable aspect of the light source).

Note that the types of the first and second active energy rays may be mutually identical or different.

The irradiation dose (amount of exposure) of the second active energy ray is 100 mJ/cm$^2$ or more, as described above.

The irradiation dose of the second active energy ray is preferably 100 to 1000 mJ/cm$^2$, is more preferably 100 to 500 mJ/cm$^2$, and is further preferably 150 to 300 mJ/cm$^2$.

In order to further reduce the blocking of the recorded image, the irradiation with the second active energy ray is preferably performed in a nitrogen atmosphere.

The oxygen concentration in an oxygen-poor atmosphere is preferably 1% or less, is more preferably 0.5% or less, and is further preferably 0.3% or less.

In the second irradiation step, alternatively, the second ink deposited on the impermeable substrate and the first ink that has been irradiated with the first active energy ray may be irradiated with an active energy ray for partial curing and subsequently irradiated with the above-described second active energy ray.

In such a case, the preferable aspect (e.g., irradiation dose) of the active energy ray for partial curing is the same as the preferable aspect (e.g., irradiation dose) of the first active energy ray used in the first irradiation step described above.

Other Steps

The image recording method according to an example of the present disclosure may include a step other than the first application step, the first irradiation step, the second application step, or the second irradiation step.

The image recording method may include, as another step, for example, a step of partially curing the second ink subsequent to the second application step. The step of partially curing the second ink is preferably a step of irradiating the second ink with an active energy ray at the same irradiation dose as in the first irradiation step.

In particular, in the case where two or more types of second inks are applied, it is preferable to partially cure a former second ink subsequent to the application of the former second ink and subsequently apply the latter second ink.

Image Recorded Article

An image recorded article according to an example of the present disclosure is an image recorded article that includes an impermeable substrate and an image recorded using the ink set according to the present disclosure. The image includes a first layer that is a cured product of the first ink and a second layer that is a cured product of the second ink. The impermeable substrate, the first layer, and the second layer are arranged in this order.

Since the image recorded article according to an example of the present disclosure includes an image recorded using the ink set according to the present disclosure, the image recorded article has the same advantageous effects as the ink set according to the present disclosure.

The image recorded article according to the example is preferably produced by the image recording method according to the above-described example.

Three-Dimensional Article and Method for Producing the Same

A method for producing a three-dimensional article according to an example of the present disclosure includes:

- a step of producing an image recorded article including an impermeable substrate and an image by the image recording method according to an example of the present disclosure; and
- a step of subjecting the image recorded article to vacuum forming to produce a three-dimensional article.

A three-dimensional article according to an example of the present disclosure is an article produced by subjecting the image recorded article according to the above-described example to vacuum forming.

As described above, the image recorded article includes an image in which bleeding is unlikely to occur and which has excellent heat stretchability.

Vacuum forming is a forming process that includes heat stretching.

Thus, according to the method for producing a three-dimensional article according to the example, it is possible to produce a three-dimensional article that includes an image in which bleeding and cracking (i.e., the cracking of the image which is caused as a result of the heat stretching performed in vacuum forming) are unlikely to occur.

An example of the vacuum forming process is described below.

In the vacuum forming process according to the example, first, an image recorded article is heated to a temperature at which it can be thermally deformed. The heated image recorded article is drawn into a die by depressurization (i.e., vacuum drawing) in order to bring the image recorded article into intimate contact with the die. As a result, the image recorded article becomes deformed into a three-dimensional shape that follows the shape of the die. In this deformation process, the image recorded article is heat-stretched.

It is preferable to use a convex die and a concave die in combination as a die.

Since the deformed image recorded article is in intimate contact with the die, the image recorded article is cooled to form a three-dimensional article.

As for vacuum forming, reference can be made to the section "Thermoforming" described on p. 766 to 768 of Concise Encyclopedia of Polymer Science and Engineering (Maruzen Co., Ltd.) and the documents cited in the section.

The temperature at which the image recorded article is heated is selected appropriately in accordance with the type of the impermeable substrate. This heating temperature is, for example, 60° C. to 180° C., is preferably 80° C. to 160° C., and is more preferably 80° C. to 150° C.

Examples of the three-dimensional article include, but are not limited to, various covers, such as smartphone covers and in-car covers; various packaging materials; and decorative films for home electrical appliances, furniture, and the like.

The image recorded article produced using the ink set according to the present disclosure can be used in not only in the above-described vacuum forming process but also a general forming process in which heat stretching is performed.

In the case where the image recorded article is used in a forming process in which heat stretching is performed, the advantageous effects of the ink set according to the present disclosure, that is, the reduction in the bleeding of the image and the improvement of the heat stretchability of the image, are achieved.

Image Recorded Article and Three-Dimensional Article

An image recorded article according to an example of the present disclosure is an image recorded article that includes an impermeable substrate and an image recorded using the ink set according to the present disclosure. The image includes a first layer that is a cured product of the first ink and a second layer that is a cured product of the second ink. The impermeable substrate, the first layer, and the second layer are arranged in this order.

Since the image recorded article according to an example of the present disclosure includes an image recorded using the ink set according to the present disclosure, the image recorded article has the same advantageous effects as the ink set according to the present disclosure.

The image recorded article according to the example is preferably produced by the image recording method according to the above-described example.

A three-dimensional article according to an example of the present disclosure is a three-dimensional article produced by subjecting the image recorded article according to an example of the present disclosure to vacuum forming.

Thus, a three-dimensional article according to an example of the present disclosure includes an image in which bleeding and cracking (i.e., the cracking of the image which is caused as a result of the heat stretching performed in vacuum forming) are unlikely to occur.

Specific examples of the three-dimensional article are as described above.

EXAMPLES

Examples of the present disclosure are described below. Note that the present disclosure is not limited to Examples below.

Hereinafter, "%" and "part" mean "% by mass" and "part by mass", respectively, unless otherwise specified.

The term "water" refers to ion-exchange water.

The materials used in Examples are described below.

Colorant
- IRGALITE BLUE GLVO (cyan pigment, produced by BASF SE Japan)
- CINQUASIA MAGENTA RT-335 D (magenta pigment, produced by BASF SE Japan)
- NOVOPERM YELLOW H2G (yellow pigment, produced by Clariant AG)
- SPECIAL BLACK 250 (black pigment, produced by BASF SE Japan)
- Tipaque CR60-2 (white pigment (titanium dioxide), produced by Ishihara Sangyo Kaisha, Ltd.)

Dispersant
- SOLSPERSE 32000 (dispersant produced by Noveon)

Ethylenic Unsaturated Compound
- PEA (monofunctional): 2-phenoxyethyl acrylate (SR339, produced by Sartomer Japan, Inc., monofunctional monomer)
- IBOA (monofunctional): isobornyl acrylate (SR506D, produced by Sartomer Japan, Inc., monofunctional monomer)
- NVC (monofunctional): N-vinylcaprolactam (produced by BASF SE Japan, monofunctional monomer)
- BZA (monofunctional): benzyl acrylate (produced by Osaka Organic Chemical Industry Ltd., monofunctional monomer)
- HDDA (difunctional): 1,6-hexanediol diacrylate (produced by Osaka Organic Chemical Industry Ltd., difunctional monomer)

Tegorad 2010 (penta or hexafunctional): penta or hexafunctional silicone polyether acrylate (produced by Degussa AG) (silicone compound having an ethylenic unsaturated group)

Polymerization Initiator

ITX: isopropylthioxanthone (produced by s Shell Chemicals Japan Ltd.)

819: Omnirad 819 (bis(2,4,6-trimethylbenzoyl)phenylphosphine oxide, produced by IGM Resins B.V., molecular weight: 419)

of 0.65 mm at a rotation speed of 9 m/s for 4 hours to form a cyan mill base.

Preparation of Magenta, Yellow, Black, and White Mill Bases

Magenta, yellow, black, and white mill bases were each prepared as in the preparation of the cyan mill base, except that the combination of the materials charged into the disperser and the dispersion conditions was changed as described in Table 1.

TABLE 1

| | | Mill base | | | | |
|---|---|---|---|---|---|---|
| | | Cyan mill base | Magenta mill base | Yellow mill base | Black mill base | White mill base |
| Composition (mass %) | IRGALITE BLUE GLVO | 30 | | | | |
| | CINQUASIA MAGENTA RT-335 D | | 30 | | | |
| | NOVOPERM YELLOW H2G | | | 30 | | |
| | SPECIAL BLACK 250 | | | | 40 | |
| | Tipaque CR60-2 | | | | | 50 |
| | PEA | 62 | 60 | 60 | 52 | 44 |
| | SOLSPERSE 32000 | 8 | 10 | 10 | 8 | 6 |
| Dispersion conditions | Rotation speed (m/s) | 9 | 9 | 9 | 9 | 9 |
| | Time (h) | 4 | 10 | 10 | 7 | 4 |

Polymer

BR113: acrylic polymer produced by Mitsubishi Chemical Corporation, "DIANAL (registered trademark) BR113"

Polymerization Inhibitor

UV-12: FLORSTAB UV12 (nitroso polymerization inhibitor, tris(N-nitroso-N-phenylhydroxylamine) aluminum salt, produced by Kromachem)

Surfactant

BYK307 (produced by BYK Chemie; silicone surfactant)

Impermeable Substrate (Hereinafter, Referred to Simply as "Substrate")

Substrate A: PYLEN Film 1146 (produced by Toyobo Co., Ltd., polypropylene (PP) substrate, thickness: 70 μm)

Substrate B: PURETHERMO AG-356AS produced by Idemitsu Unitech Co., Ltd., polypropylene (PP) substrate, thickness: 200 μm)

Substrate C: Panlite PC-2151 (produced by Teijin Limited, polycarbonate (PC) substrate, thickness: 300 μm)

Substrate D: Lumirror T60 (produced by Toray Industries, Inc., polyethylene terephthalate (PET) substrate, thickness: 100 μm)

Substrate E: Technolloy S001G (produced by Sumitomo Chemical Co., Ltd., polymethyl methacrylate (PMMA) substrate, thickness: 125 μm)

Preparation of Mill Bases

Preparation of Cyan Mill Base

IRGALITE BLUE GLVO (30 parts by mass), PEA (62 parts by mass), and SOLSPERSE 32000 (8 parts by mass) were charged into a disperser (Motor Mill M50, produced by Eiger) and dispersed with zirconia beads having a diameter Examples 1 to 30 and Comparative Examples 1 to 3

Preparation of First and Second Inks

The first inks of Examples and Comparative Examples were each prepared by mixing and stirring the components described in Tables 2 to 5 with a mixer (L4R produced by Silverson) at 25° C. at 5,000 rotations/min for 20 minutes. These first inks were inks modeled on a coating ink or a flexographic ink.

The second inks of Examples and Comparative Examples were each prepared by mixing and stirring the components described in Tables 2 to 5 with a mixer (L4R produced by Silverson) at 25° C. at 5,000 rotations/min for 20 minutes. These second inks were inks modeled on an ink jet ink.

In Tables 2 to 5, the contents of the components of each ink are the proportions of the components to the total amount of the ink and expressed in units of % by mass.

In the column of "Ink type" of Tables 2 to 5, CL, C, M, Y, W, and K refer to clear, cyan, magenta, yellow, white, and black inks, respectively.

Preparation of Ink Sets

For each of Examples and Comparative Examples, an ink set that was a combination of the first and second inks described in Tables 2 to 5 was prepared.

Preparation of Image Recording Apparatus

An image recording apparatus (specifically, ink jet recording apparatus) that included a transport system that transports a substrate; and a roller coater, an ultraviolet (UV) light source, a head for black ink, a UV light source, a head for cyan ink, a UV light source, a head for magenta ink, a UV light source, a head for yellow ink, a UV light source, a head for white ink, a UV light source, and a nitrogen purge UV exposure machine that were arranged in order from the upstream side in the direction in which a recording medium is transported was prepared.

The transport system used was a single-pass transport system of a sheet-fed printing press.

The heads for black, cyan, magenta, yellow, and white inks were piezoelectric ink jet heads (specifically, line heads) including ink jet nozzles (hereinafter, also referred to simply as "nozzles"). Each of the nozzles was capable of ejecting multi-size dots having a volume of 1 to 60 pL at a resolution of 1,200 dpi×1,200 dpi. Note that "dpi" refers to the number of dots per 2.54 cm.

The UV light source disposed immediately after each of the ink jet heads was a light emitting diode (LED) lamp capable of emitting UV light having a wavelength of 385 nm.

The UV light source included in the nitrogen purge UV exposure machine was an LED lamp capable of emitting UV light having a wavelength of 365 nm.

The amount of nitrogen used for purging by the nitrogen purge UV exposure machine was adjusted such that the oxygen concentration in the atmosphere was 1% by volume and the nitrogen concentration in the atmosphere was 99% by volume.

Image Recording

Images used for the evaluations described below were recorded using the above-described image recording apparatus.

While the substrate was transported at a transport speed of 30 m/min, the first ink was applied to the transported substrate with the roller coater in the pattern of a solid image (i.e., the pattern of an image having a dot percent of 100%). The first ink deposited was irradiated with UV light using the UV light source disposed immediately after the roller coater at the amount of exposure (i.e., irradiation dose) described in the column "First ink" in Table 2.

The second ink was ejected from an ink head corresponding to the type of the ink and applied to the first ink that had been irradiated with UV light. The region to which the second ink was applied was set to the region corresponding to one of the evaluations described below.

The entirety of the second ink deposited on the impermeable substrate and the entirety of the first ink that had been irradiated with UV light were irradiated with UV light using the nitrogen purge UV exposure machine in a nitrogen atmosphere having an oxygen concentration of 1% by volume at the amount of exposure (i.e., irradiation dose) described in the column "Second ink" in Table 2.

An image including a first layer formed of the first ink and a second layer disposed on the first layer and formed of the second ink was recorded on the substrate in the above-described manner. Hereby, an image recorded article was prepared.

Evaluation of Bleeding of Image

The region to which the second ink was applied was set to a region having a shape of a letter having a size of 6 pt, 8 pt, 10 pt, or 12 pt. In accordance with the above-described image recording, an image consisting of a solid film (first layer) formed of the first ink and a gothic letter (second layer) having one of the above sizes which was disposed on the first layer and formed of the second ink was recorded. Hereby, an image recorded article was prepared.

FIG. 1 is a schematic diagram illustrating the letter (i.e., the letter formed of the second ink) used in the evaluation of bleeding of the image.

The letter included in the image recorded article which had the above size was inspected for the reproducibility of the letter having the size. The bleeding of the image was evaluated in accordance with the following evaluation criteria.

Tables 2 to 5 list the results.

In the evaluation criteria below, examples in which the bleeding of the image was most reduced are rated as "5".

The term "the reproducibility of the letter" used herein refers to a capability to form the letter without the spaces included in the letter illustrated in FIG. 1 being filled with the ink.

Criteria for Evaluating Bleeding of Image
  5: Capable of reproducing a 6 pt letter.
  4: Incapable of reproducing a 6 pt letter but is capable of reproducing a 8 pt letter.
  3: Incapable of reproducing a 8 pt letter but is capable of reproducing a 10 pt letter.
  2: Incapable of reproducing a 10 pt letter but is capable of reproducing a 12 pt letter.
  1: Incapable of reproducing a 12 pt letter.

Evaluation of Graininess of Image

The region to which the second ink was applied was set to a dot region having a dot percent of 50% (10 cm×10 cm size). In accordance with the above-described image recording, an image consisting of a solid film (first layer) formed of the first ink and dots (second layer having a dot percent of 50%, 10 cm×10 cm size) disposed on the first layer and formed of the second ink was recorded. Hereby, an image recorded article was prepared.

A white paper sheet (when the second ink was white ink, a black paper sheet) was superimposed on the surface of the image recorded article on which the image was not recorded. In this state, the image was inspected from the distance of 50 cm from the image-recorded surface. The graininess of the image was evaluated in accordance with the following evaluation criteria.

Tables 2 to 5 list the results.

In the evaluation criteria below, examples in which the graininess of the image was most reduced are rated as "5".

Criteria for Evaluating Graininess of Image
  5: Graininess was not confirmed.
  4: Graininess was slightly confirmed but negligible.
  3: Graininess was confirmed but acceptable.
  2: Graininess was noticeable.
  1: Graininess was considerably noticeable.

Evaluation of Blocking of Image

The blocking of the image was evaluated in the following manner.

The region to which the second ink was applied was set to the shape of a solid image. In accordance with the above-described image recording, an image (average thickness: 30 μm) consisting of a solid film (first layer) formed of the first ink and a solid film (second layer) disposed on the first layer and formed of the second ink was recorded. Hereby, an image recorded article was prepared.

An A6-size paper sheet was placed on the image-recorded surface of the image recorded article. While a load of 1 kg/A6 size was applied onto the paper sheet, holding was performed at 40° C. for 24 hours. After the lapse of 24 hours, whether or not the image was transferred to the paper sheet was visually inspected. In the case where the image was transferred, the proportion (%) of the area of the image transferred on the paper sheet to the area of the paper sheet was measured.

The blocking of the image was evaluated on the basis of the above results in accordance with the following evaluation criteria.

Tables 2 to 5 List the Results.

In the evaluation criteria below, examples in which the blocking of the image was most reduced (i.e., examples that were the most excellent in terms of the curability of the first and second inks) are rated as "5".

Criteria for Evaluating Blocking of Image
  5: Transfer did not occur.
  4: The area of the image transferred on the paper sheet was more than 0% and less than 5% of the area of the paper sheet.
  3: The area of the image transferred on the paper sheet was 5% or more and less than 25% of the area of the paper sheet.
  2: The area of the image transferred on the paper sheet was 25% or more and less than 50% of the area of the paper sheet.
  1: The area of the image transferred on the paper sheet was 50% or more of the area of the paper sheet.

Heat Stretchability of Image

The region to which the second ink was applied was set to the shape of a solid image. In accordance with the above-described image recording, an image (average thickness: 30 μm) consisting of a solid film (first layer) formed of the first ink and a solid film (second layer) disposed on the first layer and formed of the second ink was recorded. Hereby, an image recorded article was prepared.

A sample having a size of 5 cm long×2 cm wide was taken from the image recorded region of the image recorded article. This sample was subjected to heat stretching using the following testing machine under the following conditions:

Testing machine: TENSILON (produced by Shimadzu Corporation)
  Conditions: temperature: 180° C., cross head speed: 50 mm/min The heat stretching ratio was calculated using the following equation on the basis of the length of the sample measured at the time when cracking of the image occurred (hereinafter, this length is referred to as "length X2") and the length of the sample measured prior to the heat stretching (hereinafter, this length is referred to as "length X1"; specifically, 5 cm).

$$\text{Heat stretching ratio (\%)} = \{(\text{Length}X2 - \text{Length}X1)/\text{Length}X1\} \times 100$$

For example, in the case where the length X2 is 10 cm, the stretching ratio is calculated to be 100% as described below.

$$\text{Heat stretching ratio (\%)} = \{(10\ cm - 5\ cm)/5\ cm\} \times 100 = 100\%$$

The heat stretchability of the image was evaluated on the basis of the heat stretching ratio calculated as described above, in accordance with the following evaluation criteria. Tables 2 to 5 list the results.

In the evaluation criteria below, examples in which the heat stretchability of the image was most excellent are rated as "5".

Criteria for Evaluating Heat Stretchability of Image
  5: The heat stretching ratio was 200% or more.
  4: The heat stretching ratio was 150% or more and less than 200%.
  3: The heat stretching ratio was 100% or more and less than 150%.
  2: The heat stretching ratio was 70% or more and less than 100%.
  1: The heat stretching ratio was less than 70%.

TABLE 2

|  |  | Example 1 | | Example 2 | | Example 3 | | Example 4 | | Example 5 |
| --- | --- | --- | --- | --- | --- | --- | --- | --- | --- | --- |
|  |  | First ink | Second ink | First ink | Second ink | First ink | Second ink | First ink | Second ink | First ink |
| Ink category |  |  |  |  |  |  |  |  |  |  |
| Ink type |  | CL | C | CL | C | CL | C | CL | C | CL |
| Ethylenic unsaturated compound | PEA (monofunctional) | 38.0 | 40.0 | 37.5 | 41.0 | 38.0 | 40.9 | 38.0 | 40.5 | 38.0 |
|  | IBOA (monofunctional) | 45.0 | 45.0 | 45.0 | 45.0 | 45.0 | 45.0 | 45.0 | 45.0 | 45.0 |
|  | NVC (monofunctional) |  |  |  |  |  |  |  |  |  |
|  | BZA (monofunctional) |  |  |  |  |  |  |  |  |  |
|  | HDDA (difunctional) |  |  |  |  |  |  |  |  |  |
|  | Tegorad2010 (penta or hexafunctional) |  |  |  |  |  |  |  |  |  |
| Photopolymerization initiator | ITX |  | 2.0 |  | 2.0 |  | 2.0 |  | 2.0 |  |
|  | 819 | 4.0 | 4.0 | 4.0 | 4.0 | 4.0 | 4.0 | 4.0 | 4.0 | 4.0 |
| Polymer | BR113 | 11.0 |  | 11.0 |  | 11.0 |  | 11.0 |  | 11.0 |
| Polymerization inhibitor | UV-12 | 0.5 | 0.5 | 0.5 | 0.5 | 0.5 | 0.5 | 0.5 | 0.5 | 0.5 |
| Surfactant | BYK307 | 1.5 | 1.0 | 2.0 |  | 1.5 | 0.1 | 1.5 | 0.5 | 1.5 |
| Mill base | Cyan mill base |  | 7.5 |  | 7.5 |  | 7.5 |  | 7.5 |  |
|  | Magenta mill base |  |  |  |  |  |  |  |  |  |
|  | Yellow mill base |  |  |  |  |  |  |  |  |  |
|  | Black mill base |  |  |  |  |  |  |  |  |  |
|  | White mill base |  |  |  |  |  |  |  |  |  |
| Total (mass part) |  | 100.0 | 100.0 | 100.0 | 100.0 | 100.0 | 100.0 | 100.0 | 100.0 | 100.0 |
| Content of monofunctional monomer to total amount of ethylenic unsaturated compound (mass %) |  | 100.0 | 100.0 | 100.0 | 100.0 | 100.0 | 100.0 | 100.0 | 100.0 | 100.0 |
| Surface tension [mN/m] |  | 22 | 24 | 20 | 40 | 22 | 37 | 22 | 32 | 22 |
| Ink viscosity at 25° C. (mPa · s) |  | 55 | 11 | 55 | 11 | 55 | 11 | 55 | 11 | 55 |
| Amount of exposure [mJ/cm2] |  | 20 | 200 | 20 | 200 | 20 | 200 | 20 | 200 | 20 |
| Surface tension difference (T2 − T1) [mN/m] |  |  | 2 |  | 20 |  | 15 |  | 10 |  | 1 |
| Viscosity ratio (V1/V2) |  |  | 5.0 |  | 5.0 |  | 5.0 |  | 5.0 |  | 5.0 |
| Substrate |  |  | A |  | A |  | A |  | A |  | A |
| Evaluation results | Bleeding |  | 5 |  | 5 |  | 5 |  | 5 |  | 4 |
|  | Graininess |  | 5 |  | 3 |  | 4 |  | 5 |  | 5 |
|  | Blocking |  | 3 |  | 3 |  | 3 |  | 3 |  | 3 |
|  | Heat stretchability |  | 5 |  | 5 |  | 5 |  | 5 |  | 5 |

TABLE 2-continued

|  |  | Example 5 | Example 6 | | Example 7 | | Example 8 | | Example 9 |
|---|---|---|---|---|---|---|---|---|---|
| Ink category |  | Second ink | First ink | Second ink | First ink | Second ink | First ink | Second ink | First ink | Second ink |
| Ink type |  | C | CL | C | CL | C | CL | C | CL | M |
| Ethylenic unsaturated compound | PEA (monofunctional) | 39.7 | 28.0 | 30.0 | 38.0 | 40.0 | 28.0 | 30.0 | 28.0 | 25.0 |
|  | IBOA (monofunctional) | 45.0 | 35.0 | 35.0 | 45.0 | 45.0 | 35.0 | 35.0 | 35.0 | 35.0 |
|  | NVC (monofunctional) |  | 20.0 | 20.0 |  |  | 20.0 | 20.0 | 20.0 | 20.0 |
|  | BZA (monofunctional) |  |  |  |  |  |  |  |  |  |
|  | HDDA (difunctional) |  |  |  |  |  |  |  |  |  |
|  | Tegorad2010 (penta or hexafunctional) |  |  |  | 1.5 | 1.0 | 1.5 | 1.0 | 1.5 | 1.0 |
| Photopolymerization initiator | ITX | 2.0 |  | 2.0 |  | 2.0 |  | 2.0 |  | 2.0 |
|  | 819 | 4.0 | 4.0 | 4.0 | 4.0 | 4.0 | 4.0 | 4.0 | 4.0 | 4.0 |
| Polymer | BR113 |  | 11.0 |  | 11.0 |  | 11.0 |  | 11.0 |  |
| Polymerization inhibitor | UV-12 | 0.5 | 0.5 | 0.5 | 0.5 | 0.5 | 0.5 | 0.5 | 0.5 | 0.5 |
| Surfactant | BYK307 | 1.3 | 1.5 | 1.0 |  |  |  |  |  |  |
| Mill base | Cyan mill base | 7.5 |  | 7.5 |  | 7.5 |  | 7.5 |  |  |
|  | Magenta mill base |  |  |  |  |  |  |  |  | 12.5 |
|  | Yellow mill base |  |  |  |  |  |  |  |  |  |
|  | Black mill base |  |  |  |  |  |  |  |  |  |
|  | White mill base |  |  |  |  |  |  |  |  |  |
| Total (mass part) |  | 100.0 | 100.0 | 100.0 | 100.0 | 100.0 | 100.0 | 100.0 | 100.0 | 100.0 |
| Content of monofunctional monomer to total amount of ethylenic unsaturated compound (mass %) |  | 100.0 | 100.0 | 100.0 | 98.2 | 98.9 | 98.2 | 98.9 | 98.2 | 98.9 |
| Surface tension [mN/m] |  | 23 | 22 | 24 | 22 | 24 | 22 | 24 | 22 | 24 |
| Ink viscosity at 25° C. (mPa·s) |  | 11 | 60 | 13 | 56 | 12 | 62 | 13 | 62 | 14 |
| Amount of exposure [mJ/cm2] |  | 200 | 20 | 200 | 20 | 200 | 20 | 200 | 20 | 200 |
| Surface tension difference (T2 − T1) [mN/m] |  | 1 | 2 | | 2 | | 2 | | 2 | |
| Viscosity ratio (V1/V2) |  | 5.0 | 4.6 | | 4.7 | | 4.8 | | 4.4 | |
| Substrate |  | A | A | | A | | A | | A | |
| Evaluation results | Bleeding | 4 | 5 | | 5 | | 5 | | 5 | |
|  | Graininess | 5 | 5 | | 5 | | 5 | | 5 | |
|  | Blocking | 3 | 4 | | 4 | | 5 | | 5 | |
|  | Heat stretchability | 5 | 5 | | 5 | | 5 | | 5 | |

TABLE 3

|  |  | Example 10 | | Example 11 | | Example 12 | | Example 13 | | Example 14 |
|---|---|---|---|---|---|---|---|---|---|---|
| Ink category |  | First ink | Second ink | First ink | Second ink | First ink | Second ink | First ink | Second ink | First ink |
| Ink type |  | CL | Y | CL | K | CL | W | W | C | W |
| Ethylenic unsaturated compound | PEA (monofunctional) | 28.0 | 30.0 | 28.0 | 30.0 | 28.0 | 24.0 | 24.0 | 30.0 | 24.0 |
|  | IBOA (monofunctional) | 35.0 | 35.0 | 35.0 | 35.0 | 35.0 | 31.0 | 31.0 | 35.0 | 31.0 |
|  | NVC (monofunctional) | 20.0 | 20.0 | 20.0 | 20.0 | 20.0 | 17.0 | 17.0 | 20.0 | 17.0 |
|  | BZA (monofunctional) |  |  |  |  |  |  |  |  |  |
|  | HDDA (difunctional) |  |  |  |  |  |  |  |  |  |
|  | Tegorad2010 (penta or hexafunctional) | 1.5 | 1.0 | 1.5 | 1.0 | 1.5 | 1.0 | 1.5 | 1.0 | 1.5 |
| Photopolymerization initiator | ITX |  | 2.0 |  | 2.0 |  | 2.0 |  | 2.0 |  |
|  | 819 | 4.0 | 4.0 | 4.0 | 4.0 | 4.0 | 4.0 | 4.0 | 4.0 | 4.0 |
| Polymer | BR113 | 11.0 |  | 11.0 | 1.0 | 11.0 | 1.0 | 8.0 |  | 8.0 |
| Polymerization inhibitor | UV-12 | 0.5 | 0.5 | 0.5 | 0.5 | 0.5 | 0.5 | 0.5 | 0.5 | 0.5 |
| Surfactant | BYK307 |  |  |  |  |  |  |  |  |  |
| Mill base | Cyan mill base |  |  |  |  |  |  |  | 7.5 |  |
|  | Magenta mill base |  |  |  |  |  |  |  |  |  |
|  | Yellow mill base |  | 7.5 |  |  |  |  |  |  |  |
|  | Black mill base |  |  |  | 6.5 |  |  |  |  |  |
|  | White mill base |  |  |  |  |  | 14.5 | 14.0 |  | 14.0 |
| Total (mass part) |  | 100.0 | 100.0 | 100.0 | 100.0 | 100.0 | 100.0 | 100.0 | 100.0 | 100.0 |
| Content of monofunctional monomer to total amount of ethylenic unsaturated compound (mass %) |  | 98.2 | 98.9 | 98.2 | 98.9 | 98.2 | 98.8 | 98.1 | 98.9 | 98.1 |
| Surface tension [mN/m] |  | 22 | 24 | 22 | 24 | 22 | 24 | 22 | 24 | 22 |
| Ink viscosity at 25° C. (mPa·s) |  | 62 | 13 | 62 | 14 | 62 | 15 | 70 | 13 | 70 |
| Amount of exposure [mJ/cm2] |  | 20 | 200 | 20 | 200 | 20 | 200 | 20 | 200 | 20 |
| Surface tension difference (T2 − T1) [mN/m] |  | 2 | | 2 | | 2 | | 2 | | 2 |
| Viscosity ratio (V1/V2) |  | 4.8 | | 4.4 | | 4.1 | | 5.4 | | 5.0 |
| Substrate |  | A | | A | | A | | A | | A |
| Evaluation results | Bleeding | 5 | | 5 | | 5 | | 5 | | 5 |
|  | Graininess | 5 | | 5 | | 5 | | 5 | | 5 |
|  | Blocking | 5 | | 5 | | 5 | | 5 | | 5 |
|  | Heat stretchability | 5 | | 5 | | 5 | | 5 | | 5 |

TABLE 3-continued

|  |  | Example 14 | Example 15 | | Example 16 | | Example 17 | | Example 18 | |
| --- | --- | --- | --- | --- | --- | --- | --- | --- | --- | --- |
| Ink category |  | Second ink | First ink | Second ink | First ink | Second ink | First ink | Second ink | First ink | Second ink |
| Ink type |  | M | W | Y | W | K | CL | C | CL | C |
| Ethylenic unsaturated compound | PEA (monofunctional) | 25.0 | 24.0 | 30.0 | 24.0 | 30.0 | 37.0 | 39.0 | 34.0 | 36.0 |
|  | IBOA (monofunctional) | 35.0 | 31.0 | 35.0 | 31.0 | 35.0 | 45.0 | 45.0 | 45.0 | 45.0 |
|  | NVC (monofunctional) | 20.0 | 17.0 | 20.0 | 17.0 | 20.0 |  |  |  |  |
|  | BZA (monofunctional) |  |  |  |  |  |  |  |  |  |
|  | HDDA (difunctional) |  |  |  |  |  | 1.0 | 1.0 | 4.0 | 4.0 |
|  | Tegorad2010 (penta or hexafunctional) | 1.0 | 1.5 | 1.0 | 1.5 | 1.0 |  |  |  |  |
| Photopolymerization initiator | ITX | 2.0 |  | 2.0 |  | 2.0 |  | 2.0 |  | 2.0 |
|  | 819 | 4.0 | 4.0 | 4.0 | 4.0 | 4.0 | 4.0 | 4.0 | 4.0 | 4.0 |
| Polymer | BR113 |  | 8.0 |  | 8.0 | 1.0 | 11.0 |  | 11.0 |  |
| Polymerization inhibitor | UV-12 | 0.5 | 0.5 | 0.5 | 0.5 | 0.5 | 0.5 | 0.5 | 0.5 | 0.5 |
| Surfactant | BYK307 |  |  |  |  |  | 1.5 | 1.0 | 1.5 | 1.0 |
| Mill base | Cyan mill base |  |  |  |  |  |  | 7.5 |  | 7.5 |
|  | Magenta mill base | 12.5 |  |  |  |  |  |  |  |  |
|  | Yellow mill base |  |  | 7.5 |  |  |  |  |  |  |
|  | Black mill base |  |  |  |  | 6.5 |  |  |  |  |
|  | White mill base |  | 14.0 |  | 14.0 |  |  |  |  |  |
| Total (mass part) |  | 100.0 | 100.0 | 100.0 | 100.0 | 100.0 | 100.0 | 100.0 | 100.0 | 100.0 |
| Content of monofunctional monomer to total amount of ethylenic unsaturated compound (mass %) |  | 98.9 | 98.1 | 98.9 | 98.1 | 98.9 | 98.8 | 98.9 | 95.2 | 95.5 |
| Surface tension [mN/m] |  | 24 | 22 | 24 | 22 | 24 | 22 | 24 | 22 | 24 |
| Ink viscosity at 25° C. (mPa·s) |  | 14 | 70 | 13 | 70 | 14 | 56 | 12 | 56 | 12 |
| Amount of exposure [mJ/cm2] |  | 200 | 20 | 200 | 20 | 200 | 20 | 200 | 20 | 200 |
| Surface tension difference (T2 − T1) [mN/m] |  | 2 | 2 | | 2 | | 2 | | 2 | |
| Viscosity ratio (V1/V2) |  | 5.0 | 5.4 | | 5.0 | | 4.7 | | 4.7 | |
| Substrate |  | A | A | | A | | A | | A | |
| Evaluation results | Bleeding | 5 | 5 | | 5 | | 5 | | 5 | |
|  | Graininess | 5 | 5 | | 5 | | 5 | | 5 | |
|  | Blocking | 5 | 5 | | 5 | | 5 | | 5 | |
|  | Heat stretchability | 5 | 5 | | 5 | | 4 | | 3 | |

TABLE 4

|  |  | Example 19 | | Example 20 | | Example 21 | | Example 22 | | Example 23 |
| --- | --- | --- | --- | --- | --- | --- | --- | --- | --- | --- |
| Ink category |  | First ink | Second ink | First ink | Second ink | First ink | Second ink | First ink | Second ink | First ink |
| Ink type |  | CL | C | CL | C | CL | C | CL | C | CL |
| Ethylenic unsaturated compound | PEA (monofunctional) | 46.0 | 40.0 | 43.0 | 40.0 | 41.0 | 20.0 | 40.0 | 15.0 | 37.9 |
|  | IBOA (monofunctional) | 45.0 | 45.0 | 45.0 | 45.0 | 40.0 | 45.0 | 40.0 | 45.0 | 45.0 |
|  | NVC (monofunctional) |  |  |  |  |  |  |  |  |  |
|  | BZA (monofunctional) |  |  |  |  |  | 20.0 |  | 25.0 |  |
|  | HDDA (difunctional) |  |  |  |  |  |  |  |  |  |
|  | Tegorad2010 (penta or hexafunctional) |  |  |  |  |  |  |  |  |  |
| Photopolymerization initiator | ITX |  | 2.0 |  | 2.0 |  | 2.0 |  | 2.0 | 0.5 |
|  | 819 | 4.0 | 4.0 | 4.0 | 4.0 | 4.0 | 4.0 | 4.0 | 4.0 | 4.0 |
| Polymer | BR113 | 3.0 |  | 6.0 |  | 13.0 |  | 14.0 |  | 11.0 |
| Polymerization inhibitor | UV-12 | 0.5 | 0.5 | 0.5 | 0.5 | 0.5 | 0.5 | 0.5 | 0.5 | 0.5 |
| Surfactant | BYK307 | 1.5 | 1.0 | 1.5 | 1.0 | 1.5 | 1.0 | 1.5 | 1.0 | 1.5 |
| Mill base | Cyan mill base |  | 7.5 |  | 7.5 |  | 7.5 |  | 7.5 |  |
|  | Magenta mill base |  |  |  |  |  |  |  |  |  |
|  | Yellow mill base |  |  |  |  |  |  |  |  |  |
|  | Black mill base |  |  |  |  |  |  |  |  |  |
|  | White mill base |  |  |  |  |  |  |  |  |  |
| Total (mass part) |  | 100.0 | 100.0 | 100.0 | 100.0 | 100.0 | 100.0 | 100.0 | 100.0 | 100.4 |
| Content of monofunctional monomer to total amount of ethylenic unsaturated compound (mass %) |  | 100.0 | 100.0 | 100.0 | 100.0 | 100.0 | 100.0 | 100.0 | 100.0 | 100.0 |
| Surface tension [mN/m] |  | 22 | 24 | 22 | 24 | 22 | 24 | 22 | 24 | 22 |
| Ink viscosity at 25° C. (mPa·s) |  | 12 | 11 | 25 | 11 | 120 | 7 | 130 | 6 | 55 |
| Amount of exposure [mJ/cm2] |  | 20 | 200 | 20 | 200 | 20 | 200 | 20 | 200 | 20 |
| Surface tension difference (T2 − T1) [mN/m] |  | 2 | | 2 | | 2 | | 2 | | 2 |
| Viscosity ratio (V1/V2) |  | 1.1 | | 2.3 | | 17.1 | | 21.7 | | 5.0 |
| Substrate |  | A | | A | | A | | A | | A |
| Evaluation results | Bleeding | 4 | | 5 | | 5 | | 5 | | 5 |
|  | Graininess | 5 | | 5 | | 5 | | 4 | | 5 |

TABLE 4-continued

|  |  | | | | | | | | | |
|---|---|---|---|---|---|---|---|---|---|---|
|  | Blocking | 3 | | 3 | | 3 | | 3 | | 3 |
|  | Heat stretchability | 5 | | 5 | | 5 | | 5 | | 5 |

|  |  | Example 23 | | Example 24 | | Example 25 | | Example 26 | | Example 27 | |
|---|---|---|---|---|---|---|---|---|---|---|---|
| Ink category |  | Second ink | First ink | Second ink | First ink | Second ink | First ink | Second ink | First ink | Second ink | |
| Ink type |  | C | CL | C | CL | C | CL | C | CL | C | |
| Ethylenic unsaturated compound | PEA (monofunctional) | 40.0 | 37.2 | 40.0 | 37.0 | 40.0 | 38.0 | 40.0 | 28.0 | 30.0 | |
|  | IBOA (monofunctional) | 45.0 | 45.0 | 45.0 | 45.0 | 45.0 | 45.0 | 45.0 | 35.0 | 35.0 | |
|  | NVC (monofunctional) |  |  |  |  |  |  |  | 20.0 | 20.0 | |
|  | BZA (monofunctional) |  |  |  |  |  |  |  |  |  | |
|  | HDDA (difunctional) |  |  |  |  |  |  |  |  |  | |
|  | Tegorad2010 (penta or hexafunctional) |  |  |  |  |  |  |  | 1.5 | 1.0 | |
| Photopolymerization initiator | ITX | 2.0 | 0.8 | 2.0 | 1.0 | 2.0 |  | 2.0 |  | 2.0 | |
|  | 819 | 4.0 | 4.0 | 4.0 | 4.0 | 4.0 | 4.0 | 4.0 | 4.0 | 4.0 | |
| Polymer | BR113 |  | 11.0 |  | 11.0 |  | 11.0 |  | 11.0 |  | |
| Polymerization inhibitor | UV-12 | 0.5 | 0.5 | 0.5 | 0.5 | 0.5 | 0.5 | 0.5 | 0.5 | 0.5 | |
| Surfactant | BYK307 | 1.0 | 1.5 | 1.0 | 1.5 | 1.0 | 1.5 | 1.0 |  |  | |
| Mill base | Cyan mill base | 7.5 |  | 7.5 |  | 7.5 |  | 7.5 |  | 7.5 | |
|  | Magenta mill base |  |  |  |  |  |  |  |  |  | |
|  | Yellow mill base |  |  |  |  |  |  |  |  |  | |
|  | Black mill base |  |  |  |  |  |  |  |  |  | |
|  | White mill base |  |  |  |  |  |  |  |  |  | |
| Total (mass part) |  | 100.0 | 100.0 | 100.0 | 100.0 | 100.0 | 100.0 | 100.0 | 100.0 | 100.0 | |
| Content of monofunctional monomer to total amount of ethylenic unsaturated compound (mass %) |  | 100.0 | 100.0 | 100.0 | 100.0 | 100.0 | 100.0 | 100.0 | 98.2 | 98.9 | |
| Surface tension [mN/m] |  | 24 | 22 | 24 | 22 | 24 | 22 | 24 | 22 | 24 | |
| Ink viscosity at 25° C. (mPa · s) |  | 11 | 56 | 11 | 56 | 11 | 55 | 11 | 62 | 13 | |
| Amount of exposure [mJ/cm2] |  | 200 | 20 | 200 | 20 | 200 | 100 | 200 | 20 | 200 | |
| Surface tension difference (T2 − T1) [mN/m] |  | 2 | | 2 | | 2 | | 2 | | 2 | |
| Viscosity ratio (V1/V2) |  | 5.0 | | 5.1 | | 5.1 | | 5.0 | | 4.8 | |
| Substrate |  | A | | A | | A | | A | | B | |
| Evaluation results | Bleeding | 5 | | 5 | | 5 | | 5 | | 5 | |
|  | Graininess | 5 | | 4 | | 3 | | 3 | | 5 | |
|  | Blocking | 3 | | 3 | | 3 | | 3 | | 5 | |
|  | Heat stretchability | 5 | | 5 | | 5 | | 5 | | 5 | |

TABLE 5

|  |  | Example 28 | | Example 29 | | Example 30 | | Comparative Example 1 |
|---|---|---|---|---|---|---|---|---|
| Ink category |  | First ink | Second ink | First ink | Second ink | First ink | Second ink | First ink |
| Ink type |  | CL | C | CL | C | CL | C | CL |
| Ethylenic unsaturated compound | PEA (monofunctional) | 28.0 | 30.0 | 28.0 | 30.0 | 28.0 | 30.0 | 34.0 |
|  | IBOA (monofunctional) | 35.0 | 35.0 | 35.0 | 35.0 | 35.0 | 35.0 | 41.0 |
|  | NVC (monofunctional) | 20.0 | 20.0 | 20.0 | 20.0 | 20.0 | 20.0 |  |
|  | BZA (monofunctional) |  |  |  |  |  |  |  |
|  | HDDA (difunctional) |  |  |  |  |  |  | 8.0 |
|  | Tegorad2010 (penta or hexafunctional) | 1.5 | 1.0 | 1.5 | 1.0 | 1.5 | 1.0 |  |
| Photopolymerization initiator | ITX |  | 2.0 |  | 2.0 |  | 2.0 |  |
|  | 819 | 4.0 | 4.0 | 4.0 | 4.0 | 4.0 | 4.0 | 4.0 |
| Polymer | BR113 | 11.0 |  | 11.0 |  | 11.0 |  | 11.0 |
| Polymerization inhibitor | UV-12 | 0.5 | 0.5 | 0.5 | 0.5 | 0.5 | 0.5 | 0.5 |
| Surfactant | BYK307 |  |  |  |  |  |  | 1.5 |
| Mill base | Cyan mill base |  | 7.5 |  | 7.5 |  | 7.5 |  |
|  | Magenta mill base |  |  |  |  |  |  |  |
|  | Yellow mill base |  |  |  |  |  |  |  |
|  | Black mill base |  |  |  |  |  |  |  |
|  | White mill base |  |  |  |  |  |  |  |
| Total (mass part) |  | 100.0 | 100.0 | 100.0 | 100.0 | 100.0 | 100.0 | 100.0 |
| Content of monofunctional monomer to total amount of ethylenic unsaturated compound (mass %) |  | 98.2 | 98.9 | 98.2 | 98.9 | 98.2 | 98.9 | 90.4 |
| Surface tension [mN/m] |  | 22 | 24 | 22 | 24 | 22 | 24 | 22 |
| Ink viscosity at 25° C. (mPa · s) |  | 62 | 13 | 62 | 13 | 62 | 13 | 58 |
| Amount of exposure [mJ/cm2] |  | 20 | 200 | 20 | 200 | 20 | 200 | 20 |
| Surface tension difference (T2 − T1) [mN/m] |  | 2 | | 2 | | 2 | | 2 |
| Viscosity ratio (V1/V2) |  | 4.8 | | 4.8 | | 4.8 | | 4.5 |
| Substrate |  | C | | D | | E | | A |
| Evaluation results | Bleeding | 5 | | 5 | | 5 | | 5 |
|  | Graininess | 5 | | 5 | | 5 | | 5 |

TABLE 5-continued

|  |  | Comparative Example 1 | Comparative Example 2 | Comparative Example 3 |  |  |
|---|---|---|---|---|---|---|
| Blocking |  | 5 | 5 | 5 | 5 |  |
| Heat stretchability |  | 5 | 5 | 5 | 1 |  |

|  |  | Comparative Example 1 | Comparative Example 2 |  | Comparative Example 3 |  |
|---|---|---|---|---|---|---|
| Ink category |  | Second ink | First ink | Second ink | First ink | Second ink |
| Ink type |  | C | CL | C | CL | C |
| Ethylenic unsaturated compound | PEA (monofunctional) | 36.0 | 38.5 | 40.0 | 38.5 | 39.5 |
|  | IBOA (monofunctional) | 41.0 | 45.0 | 45.0 | 45.0 | 45.0 |
|  | NVC (monofunctional) |  |  |  |  |  |
|  | BZA (monofunctional) |  |  |  |  |  |
|  | HDDA (difunctional) | 8.0 |  |  |  |  |
|  | Tegorad2010 (penta or hexafunctional) |  |  |  |  |  |
| Photopolymerization initiator | ITX | 2.0 |  | 2.0 |  | 2.0 |
|  | 819 | 4.0 | 4.0 | 4.0 | 4.0 | 4.0 |
| Polymer | BR113 |  | 11.0 |  | 11.0 |  |
| Polymerization inhibitor | UV-12 | 0.5 | 0.5 | 0.5 | 0.5 | 0.5 |
| Surfactant | BYK307 | 1.0 | 1.0 | 1.0 | 1.0 | 1.5 |
| Mill base | Cyan mill base | 7.5 |  | 7.5 |  | 7.5 |
|  | Magenta mill base |  |  |  |  |  |
|  | Yellow mill base |  |  |  |  |  |
|  | Black mill base |  |  |  |  |  |
|  | White mill base |  |  |  |  |  |
| Total (mass part) |  | 100.0 | 100.0 | 100.0 | 100.0 | 100.0 |
| Content of monofunctional monomer to total amount of ethylenic unsaturated compound (mass %) |  | 91.1 | 100.0 | 100.0 | 100.0 | 100.0 |
| Surface tension [mN/m] |  | 24 | 24 | 24 | 24 | 22 |
| Ink viscosity at 25° C. (mPa · s) |  | 13 | 55 | 11 | 55 | 11 |
| Amount of exposure [mJ/cm2] |  | 200 | 20 | 200 | 20 | 200 |
| Surface tension difference (T2 − T1) [mN/m] |  | 2 | 0 |  | −2 |  |
| Viscosity ratio (V1/V2) |  | 4.5 | 5.0 |  | 5.0 |  |
| Substrate |  | A | A |  | A |  |
| Evaluation results | Bleeding | 5 | 2 |  | 1 |  |
|  | Graininess | 5 | 5 |  | 5 |  |
|  | Blocking | 5 | 3 |  | 3 |  |
|  | Heat stretchability | 1 | 5 |  | 5 |  |

As described in Tables 2 to 5, the bleeding of the image was reduced and the image had excellent heat stretchability in Examples, where an ink set such that the proportion of the amount of the monofunctional monomer to the total content of the ethylenic unsaturated compound in the first ink was 95.0% by mass or more, the proportion of the amount of the monofunctional monomer to the total content of the ethylenic unsaturated compound in the second ink was 95.0% by mass or more, and the difference in surface tension (T2-T1) was 1 mN/m or more was used.

In contrast, the heat stretchability of the image became degraded in Comparative Example 1, where an ink set such that the proportion of the amount of the monofunctional monomer to the total content of the ethylenic unsaturated compound in the first ink was less than 95.0% by mass and the proportion of the amount of the monofunctional monomer to the total content of the ethylenic unsaturated compound in the second ink was less than 95.0% by mass was used.

The bleeding of the image was significant in Comparative Examples 2 and 3, where an ink set such that the difference in surface tension (T2-T1) was less than 1 mN/m was used.

In Examples, the bleeding of the image was reduced and the image had excellent heat stretchability. Therefore, the image recorded articles prepared in Examples are suitably used for producing three-dimensional articles by vacuum forming of the image recorded articles. It is considered that, in these three-dimensional articles, the bleeding of the image and the cracking of the image (i.e., the cracking of the image which is caused as a result of the heat stretching performed in vacuum forming) are reduced.

The results of Examples 2 and 3 show that the graininess of the image is further reduced when the difference in surface tension (T2-T1) is 15 mN/m or less (Example 3).

The results of Examples 5 and 6 show that the bleeding of the image is further reduced when the difference in surface tension (T2-T1) is 2 mN/m or more (Example 6).

The results of Examples 3 and 4 show that the graininess of the image is further reduced when the difference in surface tension (T2-T1) is 10 mN/m or less (Example 4).

The results of Examples 5 and 6 show that the blocking of the image is further reduced when the first and second inks include the compound (NVC) represented by Formula (A) (Example 6).

The results of Examples 5 and 7 show that the blocking of the image is further reduced when the first and second inks include the silicone compound (Tegorad 2010) including an ethylenic unsaturated group (Example 7).

The results of Examples 19 and 20 show that the bleeding of the image is further reduced when the viscosity ratio [V1/V2] is 2.0 or more (Example 20).

The results of Examples 21 and 22 show that the graininess of the image is further reduced when the viscosity ratio [V1/V2] is 20.0 or less (Example 21).

The results of Examples 24 and 25 show that the graininess of the image is further reduced when the proportion of the content of the thioxanthone compound in the first ink to the total amount of the first ink was 0.8% by mass or less (Example 24).

Although a group of examples in which one type of an ink was used as a first ink and one type of an ink was used as a second ink are described above, the present disclosure is not limited to the aspect of the group of examples.

It is needless to say that the same advantageous effects as in the above-described group of examples can be achieved also in the case where, for example, two or more types of inks (e.g., two or more selected from the group consisting of a cyan ink, a magenta ink, a yellow ink, a black ink, and a white ink) are used as second inks and/or two or more types of inks (e.g., a combination of one or more white inks and one or more clear inks) are used as first inks in the group of examples.

Japanese Patent Application No. 2020-003887 filed on Jan. 14, 2020, is incorporated herein by reference in its entirety.

All documents, patent applications, and technical standards referred to herein are incorporated herein by reference in their entirety to the same extent as when the individual documents, patent applications, and technical standards are specifically and individually indicated to be incorporated by reference in its entirety.

What is claimed is:

1. An ink set comprising:
   a first ink including an ethylenic unsaturated compound and a photopolymerization initiator, the first ink not including a colorant or including a white colorant; and
   a second ink including an ethylenic unsaturated compound, a photopolymerization initiator, and a colorant,
   wherein the ethylenic unsaturated compound included in the first ink includes:
      a monofunctional monomer that is a compound including one ethylenic unsaturated group, and a proportion of an amount of the monofunctional monomer to a total amount of the ethylenic unsaturated compound included in the first ink is 95.0% by mass or more; and
      a silicone compound having an ethylenic unsaturated group,
   wherein the ethylenic unsaturated compound included in the second ink includes:
      a monofunctional monomer that is a compound including one ethylenic unsaturated group, and a proportion of an amount of the monofunctional monomer to a total amount of the ethylenic unsaturated compound included in the second ink is 95.0% by mass or more; and
      a silicone compound having an ethylenic unsaturated group, and
   wherein, when a static surface tension of the first ink at 25° C. is defined as T1 and a static surface tension of the second ink at 25° C. is defined as T2, a value calculated by subtracting T1 from T2 is 1 mN/m or more.

2. The ink set according to claim 1,
   wherein the value calculated by subtracting T1 from T2 is 1 to 15 mN/m.

3. The ink set according to claim 1,
   wherein the value calculated by subtracting T1 from T2 is 2 to 10 mN/m.

4. The ink set according to claim 1,
   wherein the monofunctional monomer included in the first ink includes a compound represented by Formula (A) below, and a proportion of an amount of the compound represented by Formula (A) to the total amount of the ethylenic unsaturated compound included in the first ink is 5.0% by mass or more,
   wherein the monofunctional monomer included in the second ink includes a compound represented by Formula (A) below, and a proportion of an amount of the compound represented by Formula (A) to the total amount of the ethylenic unsaturated compound included in the second ink is 5.0% by mass or more, and

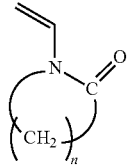

(A)

wherein, in Formula (A), n represents an integer of 2 to 6.

5. The ink set according to claim 1,
   wherein, when a viscosity of the first ink at 25° C. is defined as V1 and a viscosity of the second ink at 25° C. is defined as V2, a ratio of V1 to V2 is 2.0 to 20.0.

6. The ink set according to claim 1,
   wherein a content of a thioxanthone compound in the first ink is 0.8% by mass or less of a total amount of the first ink.

7. An image recording method in which the ink set according to claim 1 is used, the method comprising:
   a first application step of applying the first ink to an impermeable substrate;
   a first irradiation step of irradiating the first ink deposited on the impermeable substrate with a first active energy ray at an irradiation dose of 1 to 50 mJ/cm$^2$;
   a second application step of applying the second ink to the first ink irradiated with the first active energy ray; and
   a second irradiation step of irradiating the second ink deposited on the impermeable substrate and the first ink irradiated with the first active energy ray with a second active energy ray at an irradiation dose of 100 mJ/cm$^2$ or more.

8. A method for producing a three-dimensional article, the method comprising:
   a step of producing an image recorded article including the impermeable substrate and an image by the image recording method according to claim 7; and
   a step of subjecting the image recorded article to vacuum forming to produce a three-dimensional article.

9. An image recorded article comprising:
   an impermeable substrate; and
   an image recorded using the ink set according to claim 1,
   wherein the image includes a first layer that is a cured product of the first ink and a second layer that is a cured product of the second ink, and
   wherein the impermeable substrate, the first layer, and the second layer are arranged in this order.

10. A three-dimensional article that is an article produced by subjecting the image recorded article according to claim 9 to vacuum forming.

11. An ink set comprising:
    a first ink including an ethylenic unsaturated compound and a photopolymerization initiator, the first ink not including a colorant or including a white colorant; and
    a second ink including an ethylenic unsaturated compound, a photopolymerization initiator, and a colorant,
    wherein the ethylenic unsaturated compound included in the first ink includes a monofunctional monomer that is a compound including one ethylenic unsaturated group, and a proportion of an amount of the monofunctional monomer to a total amount of the ethylenic unsaturated compound included in the first ink is 95.0% by mass or more, wherein the ethylenic unsaturated compound included in the second ink includes a monofunctional monomer that is a compound including one ethylenic unsaturated group, and a proportion of an amount of the monofunctional monomer to a total amount of the ethylenic unsaturated compound included in the second ink is 95.0% by mass or more, wherein, when a static surface tension of the first ink at 25° C. is defined as T1 and a static surface tension of the second ink at 25° C. is defined as T2, a value calculated by subtracting T1 from T2 is 1 mN/m or more, and wherein, when a viscosity of the first ink at 25° C. is defined as V1 and a viscosity of the second ink at 25° C. is defined as V2, a ratio of V1 to V2 is 2.0 to 20.0.

* * * * *